US010822553B2

(12) United States Patent
Lott

(10) Patent No.: US 10,822,553 B2
(45) Date of Patent: Nov. 3, 2020

(54) MIXING SYSTEMS FOR INTRODUCING A CATALYST PRECURSOR INTO A HEAVY OIL FEEDSTOCK

(75) Inventor: Roger K. Lott, Edmonton (CA)

(73) Assignee: HYDROCARBON TECHNOLOGY & INNOVATION, LLC, Lawrenceville, NJ (US)

(*) Notice: Subject to any disclaimer, the term of this patent is extended or adjusted under 35 U.S.C. 154(b) by 1042 days.

(21) Appl. No.: 12/547,278

(22) Filed: Aug. 25, 2009

(65) Prior Publication Data
US 2009/0310435 A1 Dec. 17, 2009

Related U.S. Application Data

(60) Division of application No. 11/374,369, filed on Mar. 13, 2006, which is a continuation-in-part of application No. 11/117,262, filed on Apr. 28, 2005, now Pat. No. 7,578,928.

(60) Provisional application No. 60/566,345, filed on Apr. 28, 2004.

(51) Int. Cl.
| B01F 5/06 | (2006.01) |
| B01F 15/02 | (2006.01) |
| C10G 47/00 | (2006.01) |
| B01J 27/051 | (2006.01) |
| B01F 3/08 | (2006.01) |
| C10G 65/02 | (2006.01) |
| C10G 49/04 | (2006.01) |
| B01J 27/047 | (2006.01) |
| B01J 37/02 | (2006.01) |
| C10G 45/00 | (2006.01) |
| B01J 38/00 | (2006.01) |
| B01J 8/00 | (2006.01) |
| B01J 37/08 | (2006.01) |
| C10G 65/12 | (2006.01) |
| B01J 35/00 | (2006.01) |
| B01F 3/10 | (2006.01) |
| B01J 38/68 | (2006.01) |

(52) U.S. Cl.
CPC ............. *C10G 47/00* (2013.01); *B01F 3/088* (2013.01); *B01J 8/0015* (2013.01); *B01J 27/047* (2013.01); *B01J 27/051* (2013.01); *B01J 35/0013* (2013.01); *B01J 37/02* (2013.01); *B01J 37/086* (2013.01); *B01J 38/00* (2013.01); *C10G 45/00* (2013.01); *C10G 49/04* (2013.01); *C10G 65/02* (2013.01); *C10G 65/12* (2013.01); *B01F 2003/105* (2013.01); *B01J 38/68* (2013.01); *B01J 2208/00752* (2013.01); *C10G 2300/107* (2013.01); *C10G 2300/1033* (2013.01); *C10G 2300/1077* (2013.01); *C10G 2300/802* (2013.01)

(58) Field of Classification Search
CPC .... B01F 5/06; B01F 15/02; B01J 2219/00006
See application file for complete search history.

(56) References Cited

U.S. PATENT DOCUMENTS

| 2,850,552 A | 9/1958 | Ogle |
| 3,019,180 A | 2/1959 | Schreiener et al. |
| 3,161,585 A | 12/1964 | Gleim et al. |
| 3,254,017 A | 5/1966 | Arey, Jr. et al. |
| 3,267,021 A | 8/1966 | Gould |
| 3,297,563 A | 1/1967 | Doumani |
| 3,349,713 A | 10/1967 | Fassbender |
| 3,362,972 A | 1/1968 | Kollar |
| 3,578,690 A | 5/1971 | Becker |
| 3,595,891 A | 7/1971 | Cavitt |
| 3,622,497 A | 11/1971 | Gleim |
| 3,694,351 A | 9/1972 | White |
| 3,694,352 A | 9/1972 | Gleim |
| 3,816,020 A * | 6/1974 | Ogles ............................ 415/111 |
| 3,870,623 A | 3/1975 | Johnson et al. |
| 3,892,389 A | 7/1975 | Contastin |

(Continued)

FOREIGN PATENT DOCUMENTS

| CA | 2004882 | 6/1991 |
| CA | 2088402 | 7/1993 |

(Continued)

OTHER PUBLICATIONS

Plain et al., "Options for Resid Conversion", Axens IFP Group Technologies, pp. 1-10 (at least as early as 2004).

(Continued)

*Primary Examiner* — Randy Boyer
(74) *Attorney, Agent, or Firm* — Workman Nydegger

(57) ABSTRACT

Systems for mixing a catalyst precursor with a heavy oil feedstock preparatory to hydroprocessing the heavy oil feedstock in a reactor to form an upgraded feedstock. Achieving very good dispersion of the catalyst precursor facilitates and maximizes the advantages of the colloidal or molecular hydroprocessing catalyst. A catalyst precursor and a heavy oil feedstock having a viscosity greater than the viscosity of the catalyst precursor are provided. The catalyst precursor is pre-mixed with a hydrocarbon oil diluent, forming a diluted catalyst precursor. The diluted precursor is then mixed with at least a portion of the heavy oil feedstock so as to form a catalyst precursor-heavy oil feedstock mixture. Finally, the catalyst precursor-heavy oil feedstock mixture is mixed with any remainder of the heavy oil feedstock, resulting in the catalyst precursor being homogeneously dispersed on a colloidal and/or molecular level within the heavy oil feedstock.

36 Claims, 6 Drawing Sheets

(56) References Cited

U.S. PATENT DOCUMENTS

| | | |
|---|---|---|
| 3,915,842 A | 10/1975 | Gatsis |
| 3,919,074 A | 11/1975 | Gatsis |
| 3,953,362 A | 4/1976 | Lines et al. |
| 3,983,028 A | 9/1976 | McCollum et al. |
| 3,992,285 A | 11/1976 | Hutchings |
| 4,022,681 A | 5/1977 | Sheng et al. |
| 4,066,530 A | 1/1978 | Aldridge et al. |
| 4,066,561 A | 1/1978 | Nnadi |
| 4,067,798 A | 1/1978 | Hauschildt et al. |
| 4,067,799 A | 1/1978 | Bearden, Jr. et al. |
| 4,068,830 A | 1/1978 | Gray |
| 4,077,867 A | 3/1978 | Aldridge et al. |
| 4,083,803 A | 4/1978 | Oswald et al. |
| 4,125,455 A | 11/1978 | Herbstman |
| 4,134,825 A | 1/1979 | Bearden, Jr. et al. |
| 4,148,750 A | 4/1979 | Pine |
| 4,151,070 A | 4/1979 | Allan et al. |
| 4,178,227 A | 12/1979 | Metrailer et al. |
| 4,181,601 A | 1/1980 | Sze |
| 4,192,735 A | 3/1980 | Aldridge et al. |
| 4,196,072 A | 4/1980 | Aldridge et al. |
| 4,226,742 A | 10/1980 | Bearden, Jr. et al. |
| 4,252,634 A | 2/1981 | Khulbe et al. |
| 4,285,804 A | 8/1981 | Yves et al. |
| 4,298,454 A | 11/1981 | Aldridge et al. |
| 4,305,808 A | 12/1981 | Bowes |
| 4,313,818 A | 2/1982 | Aldridge et al. |
| 4,325,802 A | 4/1982 | Porter et al. |
| 4,338,183 A | 7/1982 | Gatsis |
| 4,352,729 A | 10/1982 | Jacquin et al. |
| 4,370,221 A | 1/1983 | Patmore et al. |
| 4,389,301 A | 6/1983 | Dahlberg et al. |
| 4,411,768 A | 10/1983 | Unger et al. |
| 4,420,008 A | 12/1983 | Shu |
| 4,422,927 A | 12/1983 | Kowalczyk et al. |
| 4,422,960 A | 12/1983 | Shiroto et al. |
| 4,427,532 A | 1/1984 | Varghese |
| 4,430,207 A | 2/1984 | Kukes |
| 4,435,314 A | 3/1984 | van de Leemput et al. |
| 4,452,265 A | 6/1984 | Lonnebring |
| 4,454,023 A | 6/1984 | Lutz |
| 4,455,218 A | 6/1984 | Dymock et al. |
| 4,465,630 A | 8/1984 | Akashi et al. |
| 4,467,049 A | 8/1984 | Yoshii et al. |
| 4,485,004 A | 11/1984 | Fisher et al. |
| 4,485,008 A | 11/1984 | Maa et al. |
| 4,508,616 A | 4/1985 | Larrauri et al. |
| 4,513,098 A | 4/1985 | Tsao |
| 4,551,230 A | 11/1985 | Kukes et al. |
| 4,557,823 A | 12/1985 | Kukes et al. |
| 4,557,824 A | 12/1985 | Kukes et al. |
| 4,561,964 A | 12/1985 | Singhal et al. |
| 4,564,441 A | 1/1986 | Kukes et al. |
| 4,567,156 A * | 1/1986 | Bearden et al. ............... 502/173 |
| 4,568,657 A | 2/1986 | Sepulveda et al. |
| 4,578,181 A | 3/1986 | Derouane et al. |
| 4,579,646 A | 4/1986 | Grosboll et al. |
| 4,581,344 A | 4/1986 | Ledoux et al. |
| 4,582,432 A | 4/1986 | Mehta |
| 4,585,545 A | 4/1986 | Yancey, Jr. et al. |
| 4,590,172 A | 5/1986 | Isaacs |
| 4,592,827 A | 6/1986 | Galiasso et al. |
| 4,592,830 A | 6/1986 | Howell et al. |
| 4,606,809 A | 8/1986 | Garg |
| 4,608,152 A | 8/1986 | Howell et al. |
| 4,613,427 A | 9/1986 | Sepulveda et al. |
| 4,626,340 A | 12/1986 | Galiasso et al. |
| 4,633,001 A | 12/1986 | Cells |
| 4,652,311 A | 3/1987 | Gulla et al. |
| 4,652,647 A | 3/1987 | Schlosberg et al. |
| 4,674,885 A | 6/1987 | Erwin et al. |
| 4,676,886 A | 6/1987 | Rahbe et al. |
| 4,678,557 A | 7/1987 | Rodriguez et al. |
| 4,693,991 A | 9/1987 | Bjornson et al. |
| 4,695,369 A | 9/1987 | Garg et al. |
| 4,701,435 A | 10/1987 | Garcia et al. |
| 4,707,245 A | 11/1987 | Baldasarri et al. |
| 4,707,246 A | 11/1987 | Gardner et al. |
| 4,710,486 A | 12/1987 | Lopez et al. |
| 4,713,167 A | 12/1987 | Reno et al. |
| 4,716,142 A | 12/1987 | Laine et al. |
| 4,724,069 A | 2/1988 | Aldag et al. |
| 4,734,186 A | 3/1988 | Parrott et al. |
| 4,740,295 A | 4/1988 | Bearden, Jr. et al. |
| 4,746,419 A | 5/1988 | Peck et al. |
| 4,762,607 A | 8/1988 | Aldridge et al. |
| 4,762,812 A | 8/1988 | Lopez et al. |
| 4,762,814 A | 8/1988 | Parrott et al. |
| 4,764,266 A | 8/1988 | Chen et al. |
| 4,765,882 A | 8/1988 | Aldridge et al. |
| 4,770,764 A | 9/1988 | Ohtake et al. |
| 4,772,378 A | 9/1988 | Miyauchi et al. |
| 4,802,972 A | 2/1989 | Kukes et al. |
| 4,808,007 A | 2/1989 | King |
| 4,812,228 A | 3/1989 | Angevine et al. |
| 4,824,611 A | 4/1989 | Cells |
| 4,824,821 A | 4/1989 | Lopez et al. |
| 4,834,865 A | 5/1989 | Kukes et al. |
| 4,837,193 A | 6/1989 | Akizuki et al. |
| 4,851,107 A | 7/1989 | Kretschmar et al. |
| 4,851,109 A | 7/1989 | Chen et al. |
| 4,857,496 A | 8/1989 | Lopez et al. |
| 4,863,887 A | 9/1989 | Ohtake et al. |
| 4,959,140 A | 9/1990 | Kukes et al. |
| 4,963,247 A | 10/1990 | Belinko et al. |
| 4,970,190 A | 11/1990 | Lopez et al. |
| 4,983,273 A | 1/1991 | Kennedy et al. |
| 4,983,558 A | 1/1991 | Born et al. |
| 5,013,427 A | 5/1991 | Mosby et al. |
| 5,017,535 A | 5/1991 | Schoonhoven et al. |
| 5,017,712 A | 5/1991 | Usui et al. |
| 5,038,392 A | 8/1991 | Morris et al. |
| 5,039,392 A | 8/1991 | Bearden, Jr. et al. |
| 5,055,174 A | 10/1991 | Howell et al. |
| 5,094,991 A | 3/1992 | Lopez et al. |
| 5,108,581 A | 4/1992 | Aldridge et al. |
| 5,114,900 A | 5/1992 | King |
| 5,134,108 A | 7/1992 | Thakur et al. |
| 5,154,818 A | 10/1992 | Harandi et al. |
| 5,162,282 A | 11/1992 | Lopez et al. |
| 5,164,075 A | 11/1992 | Lopez |
| 5,166,118 A | 11/1992 | Kretschmar et al. |
| 5,171,916 A | 12/1992 | Le et al. |
| 5,178,749 A | 1/1993 | Lopez et al. |
| 5,191,131 A | 3/1993 | Takahata et al. |
| 5,254,240 A | 10/1993 | Jacquin et al. |
| 5,281,328 A | 1/1994 | Degnan, Jr. et al. |
| 5,320,500 A | 6/1994 | Cholet |
| 5,332,709 A | 7/1994 | Nappier et al. |
| 5,358,634 A | 10/1994 | Rankel |
| 5,364,524 A | 11/1994 | Partridge et al. |
| 5,372,705 A | 12/1994 | Bhattacharya et al. |
| 5,374,348 A | 12/1994 | Sears et al. |
| 5,409,595 A | 4/1995 | Harandi et al. |
| 5,435,908 A | 7/1995 | Nelson et al. |
| 5,452,954 A | 9/1995 | Handke et al. |
| 5,460,714 A | 10/1995 | Fixari et al. |
| 5,474,977 A | 12/1995 | Gatsis |
| 5,578,197 A * | 11/1996 | Cyr et al. ...................... 208/112 |
| 5,597,236 A | 1/1997 | Fasano |
| 5,622,616 A | 4/1997 | Porter et al. |
| 5,865,537 A | 2/1999 | Streiff et al. |
| 5,866,501 A | 2/1999 | Pradhan et al. |
| 5,868,923 A | 2/1999 | Porter et al. |
| 5,871,638 A | 2/1999 | Pradhan et al. |
| 5,913,324 A | 6/1999 | Signer |
| 5,916,432 A | 6/1999 | McFarlane et al. |
| 5,925,235 A | 7/1999 | Habib |
| 5,932,090 A | 8/1999 | Marchionna et al. |
| 5,935,419 A | 8/1999 | Khan et al. |
| 5,954,945 A | 9/1999 | Cayton et al. |
| 5,962,364 A | 10/1999 | Wilson, Jr. et al. |
| 5,972,202 A | 10/1999 | Benham et al. |
| 6,004,453 A | 12/1999 | Benham |

(56) References Cited

U.S. PATENT DOCUMENTS

| | | |
|---|---|---|
| 6,059,957 A | 5/2000 | Khan et al. |
| 6,068,758 A | 5/2000 | Strausz |
| 6,086,749 A | 7/2000 | Kramer et al. |
| 6,090,858 A | 7/2000 | El-Sayed |
| 6,093,824 A | 7/2000 | Reichle et al. |
| 6,136,179 A | 10/2000 | Sherwood, Jr. et al. |
| 6,139,723 A | 10/2000 | Pelrine et al. |
| 6,190,542 B1 | 2/2001 | Comolli |
| 6,214,195 B1 | 4/2001 | Yadav et al. |
| 6,217,746 B1 | 4/2001 | Thakkar et al. |
| 6,239,054 B1 | 5/2001 | Shukis et al. |
| 6,270,654 B1 | 8/2001 | Colyar et al. |
| 6,274,530 B1 | 8/2001 | Cayton et al. |
| 6,277,270 B1 | 8/2001 | Morel et al. |
| 6,342,224 B1 | 1/2002 | Bruck et al. |
| 6,379,532 B1 | 4/2002 | Hoehn et al. |
| 6,454,932 B1 | 9/2002 | Baldassari et al. |
| 6,455,594 B1 | 9/2002 | Tsuji |
| 6,462,095 B1 | 10/2002 | Bonsel et al. |
| 6,550,960 B2 * | 4/2003 | Catalfamo et al. ............ 366/337 |
| 6,596,155 B1 | 7/2003 | Gates et al. |
| 6,660,157 B2 * | 12/2003 | Que et al. ................... 208/108 |
| 6,686,308 B2 | 2/2004 | Mao et al. |
| 6,698,917 B2 | 3/2004 | Etchells, III et al. |
| 6,712,955 B1 | 3/2004 | Hou et al. |
| 6,783,661 B1 | 8/2004 | Briot et al. |
| 6,797,153 B1 | 9/2004 | Fukuyama et al. |
| 6,884,340 B1 | 4/2005 | Bogdan |
| 6,916,762 B2 | 7/2005 | Shibuya et al. |
| 7,011,807 B2 | 3/2006 | Zhou et al. |
| 7,090,767 B2 | 8/2006 | Kaminsky et al. |
| 7,285,698 B2 * | 10/2007 | Liu et al. ................... 585/721 |
| 7,449,103 B2 | 11/2008 | Lott et al. |
| 7,517,446 B2 | 4/2009 | Lott et al. |
| 7,578,928 B2 | 8/2009 | Lott et al. |
| 7,815,870 B2 | 10/2010 | Lott et al. |
| 8,309,041 B2 | 11/2012 | Lott et al. |
| 2002/0179493 A1 | 12/2002 | Etter |
| 2003/0094400 A1 | 5/2003 | Levy et al. |
| 2003/0171207 A1 | 9/2003 | Shih et al. |
| 2004/0013601 A1 | 1/2004 | Butz et al. |
| 2004/0147618 A1 | 7/2004 | Lee et al. |
| 2005/0109674 A1 | 5/2005 | Klein |
| 2005/0241991 A1 | 11/2005 | Lott et al. |
| 2005/0241992 A1 | 11/2005 | Lott et al. |
| 2005/0241993 A1 | 11/2005 | Lott et al. |
| 2005/0258073 A1 | 11/2005 | Oballa et al. |
| 2005/0279670 A1 | 12/2005 | Long et al. |
| 2006/0060501 A1 | 3/2006 | Gauthier |
| 2006/0079396 A1 | 4/2006 | Saito |
| 2006/0175229 A1 | 8/2006 | Montanan et al. |
| 2006/0201854 A1 | 9/2006 | Lott |
| 2006/0224000 A1 | 10/2006 | Papp et al. |
| 2006/0254956 A1 | 11/2006 | Khan |
| 2006/0289340 A1 | 12/2006 | Brownscombe et al. |
| 2007/0012595 A1 | 1/2007 | Brownscombe et al. |
| 2007/0029228 A1 | 2/2007 | Aoki et al. |
| 2007/0108100 A1 | 5/2007 | Satchell, Jr. |
| 2007/0131587 A1 | 6/2007 | Fukuyama et al. |
| 2007/0138059 A1 | 6/2007 | Farshid et al. |
| 2007/0158236 A1 | 7/2007 | Zhou et al. |
| 2007/0158238 A1 | 7/2007 | Wu et al. |
| 2007/0158239 A1 | 7/2007 | Satchell |
| 2007/0163921 A1 | 7/2007 | Keusenkothen et al. |
| 2007/0175797 A1 | 8/2007 | Iki et al. |
| 2007/0209965 A1 | 9/2007 | Duddy et al. |
| 2009/0107881 A1 | 4/2009 | Lott et al. |
| 2009/0159505 A1 | 6/2009 | Da Costa et al. |
| 2009/0173666 A1 | 7/2009 | Zhou et al. |
| 2010/0065472 A1 | 3/2010 | Chabot |
| 2010/0122931 A1 | 5/2010 | Zimmerman et al. |
| 2010/0294701 A1 | 11/2010 | Lott et al. |
| 2011/0017637 A1 | 1/2011 | Reynolds et al. |
| 2011/0017641 A1 | 1/2011 | Gupta et al. |
| 2013/0068658 A1 | 3/2013 | Lott et al. |
| 2013/0075304 A1 | 3/2013 | Chang et al. |

FOREIGN PATENT DOCUMENTS

| | | |
|---|---|---|
| CA | 2579528 | 9/2007 |
| CN | 1295112 | 5/2001 |
| CN | 1966618 | 5/2007 |
| DE | 2324441 | 12/1973 |
| DE | 2315114 | 10/1974 |
| DE | 2421934 | 11/1974 |
| EP | 0199399 | 10/1986 |
| EP | 0 546 686 | 6/1993 |
| EP | 0559399 | 9/1993 |
| EP | 1043069 | 10/2000 |
| EP | 1753846 | 2/2007 |
| GB | 1047698 | 8/1963 |
| JP | Sho47-014205 | 10/1972 |
| JP | Sho 59-108091 | 6/1984 |
| JP | 60-044587 | 3/1985 |
| JP | Sho 62-39634 | 8/1987 |
| JP | 01-165692 | 6/1989 |
| JP | 2863858 | 2/1990 |
| JP | Hei 5-501829 | 4/1993 |
| JP | Hei 06-009966 | 1/1994 |
| JP | 6287574 | 10/1994 |
| JP | 06346064 | 12/1994 |
| JP | 07-062355 | 3/1995 |
| JP | Hei 7-90282 | 4/1995 |
| JP | 08-325580 | 12/1996 |
| JP | 2003193074 | 7/2003 |
| WO | WO 97/23582 | 12/1996 |
| WO | WO 97/34967 | 3/1997 |
| WO | WO 00/75336 | 12/2000 |
| WO | WO 01/01408 | 1/2001 |
| WO | WO 01/41799 | 6/2001 |
| WO | 2005/104749 | 11/2005 |
| WO | WO 06/116913 | 11/2006 |
| WO | 2007/078622 | 7/2007 |
| WO | 2007/106783 | 9/2007 |
| WO | 2009-058785 | 5/2009 |

OTHER PUBLICATIONS

"Hyvahl, Significantly Improved RFCC Performance or Low Sulfur Fuel Oils Via Residue Hydrotreatment", Axens IPF Group Technologies, pp. 1,2 (Jan. 2003).

"OCR Moving Bed Technology for the future", pp. 1-2 (at least as early as 2004).

Santori, R., et al., "Eni Slurry Technology: A Technology to Convert the Bottom of the Barrel to Transportation Fuels", 3rd Bottom of the Barrell Technology Conference & Exhibition (Oct. 2004).

Aspen Hydrocracker™: A simulation system for monitoring, planning and optimizing hydrocracking and hydrotreating units, www.aspentec.com/brochures/hydrocracker.pdf (2001).

Criterion: Hydrocracking Process Description and CRITERION/ZEOLYST Hydrocracking Catalyst Applications, www.criterioncatalysts.com (2001).

Office Action dated Feb. 4, 2008 cited in related U.S. Appl. No. 11/117,262.

Office Action dated Apr. 29, 2008 cited in related U.S. Appl. No. 11/117,202.

Office Action dated May 28, 2009 cited in U.S. Appl. No. 11/374,369.

Notice of Allowance dated Aug. 18, 2008 in U.S. Appl. No. 11/117,202.

Office Action dated Jul. 10, 2008 cited in U.S. Appl. No. 11/117,203.

Notice of Allowance dated Dec. 10, 2008 in U.S. Appl. No. 11/117,203.

Office Action dated Jul. 17, 2008 cited in U.S. Appl. No. 11/117,262.

Office Action dated Dec. 5, 2008 cited in U.S. Appl. No. 11/117,262.

Notice of Allowance dated Apr. 30, 2009 in U.S. Appl. No. 11/117,262.

Papaioannou et al., "Alkali-Metal- and Alkaline-Earth-Promoted Catalysts for Coal Liquefaction Applications", Energy & Fuels, vol. 4, No. 1, pp. 38-42 (1990).

(56) References Cited

OTHER PUBLICATIONS

Molecular Profile Report, Cobalt Benzoate, http://chemfinder.cambridgesoft.com/chembiofinder/forms/search/contentarea/chembiovizsearch.aspx?formgroupid=8&appname=chembiofinder&allowfullsearch=true&keeprecordcountsynchronized-flase&searchcriteraid=47searchcriteravalue=932-69-4&currentindex=0.

Database CA [online] Chemical Abstracts Service retrieved from STN Database accession No. 1991:42412.

Hydrocracking of Liaohe Vacuum Residue With Bimeta:, Shen et al., Preprints of Symposia—American Chemical society, Division of Fuel Chemistry (1998), 43(3), 481-485, OCDEN: Psadfz, 1998, XP009117504.

U.S. Appl. No. 11/117,262, Jun. 26, 2009, Notice of Allowance.
U.S. Appl. No. 11/968,934, Sep. 20, 2010, Office Action.
U.S. Appl. No. 11/968,934, Jan. 25, 2011, Office Action.
Office Action dated Mar. 18, 2010 cited in U.S. Appl. No. 11/374,369.
Office Action dated May 13, 2010 cited in U.S. Appl. No. 11/932,301.
Office Action dated Jan. 26, 2010 cited in U.S. Appl. No. 12/106,112.
Notice of Allowance dated Jun. 22, 2010 cited in U.S. Appl. No. 12/106,112.
Lewis, Hawley's Condensed Chemical Dictionary, 15th Ed, 2007, p. 321.
Office Action dated Nov. 26, 2010 cited in U.S. Appl. No. 12/838,761.
Bianco et al., "Upgrading heavy oil using slurry processes", Nov. 30, 1995, pp. 35-43.
Loft et al.,"(HC)3 Process—A Slurry Hydrocracking Technology Designed to Convert Bottoms of Heavy Oils", 7th Unitar International Conference of Heavy Crude and Tar Sands, Beijing, Oct. 27, 2007, pp. 1-9.
Panariti et at., "Petroleum residue upgrading with dispersed catalysts Part 1. Catalysts activity and sensitivity", Mar. 31, 2000, pp. 203-213.
Panariti et at., "Petroleum residue upgrading with dispersed catalysts Part 1. Catalysts activity and sensitivity", Mar. 31, 2000, pp. 215-222.
Office Action dated Nov. 23, 2009 cited in U.S. Appl. No. 11/932,201.
Seader et al., "Perry's Chemical Engineers' Handbook", 7th Ed., Section 13—Distillation, 1997, 13-25.
U.S. Appl. No. 11/968,934, Jul. 13, 2011, Office Action.
U.S. Appl. No. 13/116,195, filed May 26, 2011, Lott et al.
U.S. Appl. No. 13/113,722, filed May 23, 2011, Lott et al.
U.S. Appl. No. 13/561,479, filed Jul. 30, 2012, Harris et al.
U.S. Appl. No. 13/66,220, filed Apr. 19, 2013, Lott et al.
U.S. Appl. No. 13/865,726, filed Apr. 19, 2013, Lott et al.
U.S. Appl. No. 11/968,934, Jul. 12, 2011, Office Action.
U.S. Appl. No. 11/968,934, Jan. 6, 2012, Notice of Allowance.
U.S. Appl. No. 11/932,201, Apr. 21, 2011, Notice of Allowance.
U.S. Appl. No. 11/932,201, Jun. 8, 2011, Notice of Allowance.
U.S. Appl. No. 13/236,209, Sep. 19, 2011, Office Action.
U.S. Appl. No. 13/236,209, Jul. 11, 2012, Notice of Allowance.
U.S. Appl. No. 13/675,629, Feb. 7, 2013, Office Action.
U.S. Appl. No. 12/838,761, May 18, 2011, Office Action.
U.S. Appl. No. 12/838,761, Jul. 20, 2012, Office Action.
U.S. Appl. No. 12/838,761, Jan. 10, 2013, Notice of Allowance.
U.S. Appl. No. 13/116,195, Jan. 12, 2012, Office Action.
U.S. Appl. No. 13/116,195, Jul. 11, 2012, Notice of Allowance.
U.S. Appl. No. 13/113,722, Aug. 8, 2012, Office Action.
U.S. Appl. No. 13/113,722, Jan. 22, 2013, Notice of Allowance.
U.S. Appl. No. 14/095,698, filed Dec. 3, 2013, Lott et al.
U.S. Appl. No. 13/866,220, Jun. 28, 2013, Office Action.
U.S. Appl. No. 13/866,220, Nov. 13, 2008, Notice of Allowance.
U.S. Appl. No. 13/675,629, Jun. 14, 2013, Notice of Allowance.
U.S. Appl. No. 13/865,726, Jan. 11, 2016, Final Office Action.
U.S. Appl. No. 13/561,479, Apr. 27, 2016, Office Action.
U.S. Appl. No. 11/374,369, May 18, 2016, Office Action.
U.S. Appl. No. 14/836,792, filed Aug. 26, 2015, Harris et al.
U.S. Appl. No. 11/374,369, Mar. 12, 2014, Office Action.
U.S. Appl. No. 13/242,979, Aug. 21, 2014, Office Action.
U.S. Appl. No. 11/374,369, Aug. 28, 2014, Office Action.
U.S. Appl. No. 13/242,979, Mar. 12, 2015, Final Office Action.
U.S. Appl. No. 13/865,726, May 12, 2015, Office Action.
U.S. Appl. No. 13/561,479, Aug. 11, 2015, Office Action.
U.S. Appl. No. 13/561,479, Nov. 4, 2015, Final Office Action.

\* cited by examiner

= Mo atom
= S atom

= Mo atom
= S atom

MIXING SYSTEMS FOR INTRODUCING A CATALYST PRECURSOR INTO A HEAVY OIL FEEDSTOCK

RELATED APPLICATIONS

The present application is a division of U.S. patent application Ser. No. 11/374,369, filed Mar. 13, 2006, which is a continuation-in-part of U.S. patent application Ser. No. 11/117,262, filed Apr. 28, 2005, and entitled "HYDROPROCESSING METHOD AND SYSTEM FOR UPGRADING HEAVY OIL USING A COLLOIDAL OR MOLECULAR CATALYST, which claims the benefit under 35 U.S.C. § 119 of U.S. provisional application Ser. No. 60/566,345, filed Apr. 28, 2004. The foregoing applications are incorporated herein in their entirety.

BACKGROUND OF THE INVENTION

1. The Field of the Invention

The present invention is in the field of upgrading heavy oil feedstocks into lower boiling, higher quality materials. More particularly, the invention relates to systems and methods for mixing a catalyst precursor containing a molybdenum salt or complex with heavy oil feedstocks to form, in-situ, a hydroprocessing catalyst.

2. Related Technology

World demand for refined fossil fuels is ever-increasing and will eventually outstrip the supply of high quality crude oil. As the shortage of high quality crude oil increases there will be an increasing demand to find ways to better exploit lower quality feedstocks and extract fuel values from them.

Lower quality feedstocks are characterized as including relatively high quantities of hydrocarbons that have a boiling point of 524° C. (975° F.) or higher. They also contain relatively high concentrations of sulfur, nitrogen and/or metals. High boiling fractions typically have a high molecular weight and/or low hydrogen/carbon ratio, an example of which is a class of complex compounds collectively referred to as "asphaltenes". Asphaltenes are difficult to process and commonly cause fouling of conventional catalysts and hydroprocessing equipment.

Examples of lower quality feedstocks that contain relatively high concentrations of asphaltenes, sulfur, nitrogen and metals include heavy crude and oil sands bitumen, as well as bottom of the barrel and residuum left over from conventional refinery process (collectively "heavy oil"). The terms "bottom of the barrel" and "residuum" (or "resid") typically refer to atmospheric tower bottoms, which have a boiling point of at least 343° C. (650° F.), or vacuum tower bottoms, which have a boiling point of at least 524° C. (975° F.). The terms "resid pitch" and "vacuum residue" are commonly used to refer to fractions that have a boiling point of 524° C. (975° F.) or greater.

Converting heavy oil into useful end products requires extensive processing, including reducing the boiling point of the heavy oil, increasing the hydrogen-to-carbon ratio, and removing impurities such as metals, sulfur, nitrogen and high carbon forming compounds.

When used with heavy oil, existing commercial catalytic hydrocracking processes become fouled or rapidly undergo catalyst deactivation. The undesirable reactions and fouling involved in hydrocracking heavy oil greatly increases the catalyst and maintenance costs of processing heavy oils, making current catalysts unsuitable for hydroprocessing heavy oil.

One promising technology for hydroprocessing heavy oils uses a hydrocarbon-soluble molybdenum salt that decomposes in the heavy oil during hydroprocessing to form, in situ, a hydroprocessing catalyst, namely molybdenum sulfide. One such process is disclosed in U.S. Pat. No. 5,578,197 to Cyr et al., which is incorporated herein by reference. Once formed in situ, the molybdenum sulfide catalyst is highly effective at hydrocracking asphaltenes and other complicated hydrocarbons while preventing fouling and coking.

A significant problem with commercializing oil soluble molybdenum catalysts is the cost of the catalyst. Even small improvements in catalyst performance can have a significant benefit to the cost of the hydrocracking process due to the increase in output and/or the reduced use of the catalyst.

The performance of oil soluble molybdenum catalysts depends significantly on the concentration of the metal catalyst in the heavy oil and on how well the catalyst precursor can be dispersed in the heavy oil. Improvements that can more efficiently and effectively disperse the catalyst precursor can improve the efficiency of hydrocracking heavy oils using oil soluble molybdenum compounds.

SUMMARY OF THE INVENTION

The present invention relates to methods and systems for mixing a catalyst precursor with a heavy oil feedstock preparatory to hydroprocessing the heavy oil feedstock in a reactor to form an upgraded feedstock. The inventive methods and systems advantageously provide for formation of a colloidal or molecular hydroprocessing catalyst. Achieving good dispersion of the catalyst precursor (i.e., achieving dispersion down to the molecular level) is advantageous as it facilitates formation of the colloidal or molecular hydroprocessing catalyst. The use of a well dispersed colloidal or molecular hydroprocessing catalyst advantageously overcomes the problems associated with the use of porous supported catalysts in upgrading heavy oil feedstocks, particularly the inability of porous supported catalysts to effectively process asphaltene molecules. The result is one or more of reduced equipment fouling, increased conversion level, enabling the reactor to process a wider range of lower quality feedstocks, and more efficient use of the supported catalyst if used in combination with the colloidal or molecular catalyst.

According to the inventive method, a catalyst precursor having a relatively low viscosity and a heavy oil feedstock having a higher viscosity are provided. The catalyst precursor is mixed with a hydrocarbon diluent (e.g., vacuum gas oil, decant oil, cycle oil, or light gas oil), forming a diluted precursor composition. The diluted precursor composition is mixed with at least a portion of the heavy oil feedstock so as to form a blended feedstock composition. Finally, the blended feedstock composition is mixed with any remaining feedstock, resulting in the catalyst precursor being homogeneously dispersed down to the molecular level within the heavy oil feedstock.

An exemplary system for performing the inventive method includes a first static low shear in-line mixer for mixing the catalyst precursor with the diluent so as to form a diluted catalyst precursor; a second static low shear in-line mixer followed by a high shear mixer for mixing the diluted catalyst precursor with at least a portion of the heavy oil feedstock so as to form a blended feedstock composition; and an optional surge tank into which the blended feedstock composition and any remaining heavy oil feedstock are introduced. If provided, the surge tank may advantageously provide a residence time of between about 5 minutes and about 60 minutes, preferably between about 10 minutes and about 50 minutes, and more preferably between about 20 and about 40 minutes so as to allow the first component to more evenly diffuse throughout the heavy oil second component. The result is that the catalyst precursor is homogeneously dispersed down to the molecular level within the heavy oil feedstock preparatory to formation of the colloidal or molecular catalyst.

According to one embodiment, the diluent may comprise a portion of the heavy oil feedstock instead of, or in addition to, one or more of vacuum gas oil, decant oil, cycle oil, or light gas oil.

In a preferred embodiment, the in-line static mixers used to mix the catalyst precursor with the hydrocarbon diluent and the diluted catalyst precursor with the heavy oil feedstock are characterized as including about 2 to about 20 stages, more preferably from about 7 to about 15 stages, and most preferably from about 8 to about 12 stages. If the catalyst precursor is well mixed with the majority of the heavy oil feedstock, a portion of the heavy oil feedstock may be fed into the surge vessel without having been pre-mixed with the diluted catalyst precursor, relying on molecular diffusion within the surge tank and subsequent pumping to the multi-stage high pressure pumps, to achieve the desired thorough mixing of the catalyst precursor with the totality of the heavy oil feedstock.

The one or more multi-stage high pressure pumps used to pressurize the blended feedstock material leaving the surge tank preferably include at least about 10 compression stages. Multiple multi-stage high pressure pumps may be arranged in series and/or parallel to each other to either increase the effective number of compression stages (series) or to increase the capacity for delivery to a downstream hydroprocessing system (parallel). According to a currently preferred embodiment, the apparatus for mixing the diluted catalyst precursor with at least a portion of the heavy oil feedstock comprises a single in-line static mixer followed by a high sheer mixer. The high shear mixer most preferably has a relatively short residence time such that most of the total mixing time is accounted for by the static mixer. This configuration uses the pressure drop of the static mixer to advantageously achieve a degree of mixing, followed by further mixing within the high shear mixer.

The heavy oil feedstock is preferably divided into two separate streams for progressive mixing with the diluted catalyst precursor. The first stream that is initially mixed with the diluted catalyst precursor preferably comprises about 10% to about 95% of the total flow, more preferably about 40% to about 80% of the total flow, and most preferably about 65% to about 75% of the total flow. Combined heavy oil feedstock into two streams provides for excellent mixing, while minimizing operational and structural costs associated with dividing feedstock into three streams.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Definitions and Introduction

Figure 1:
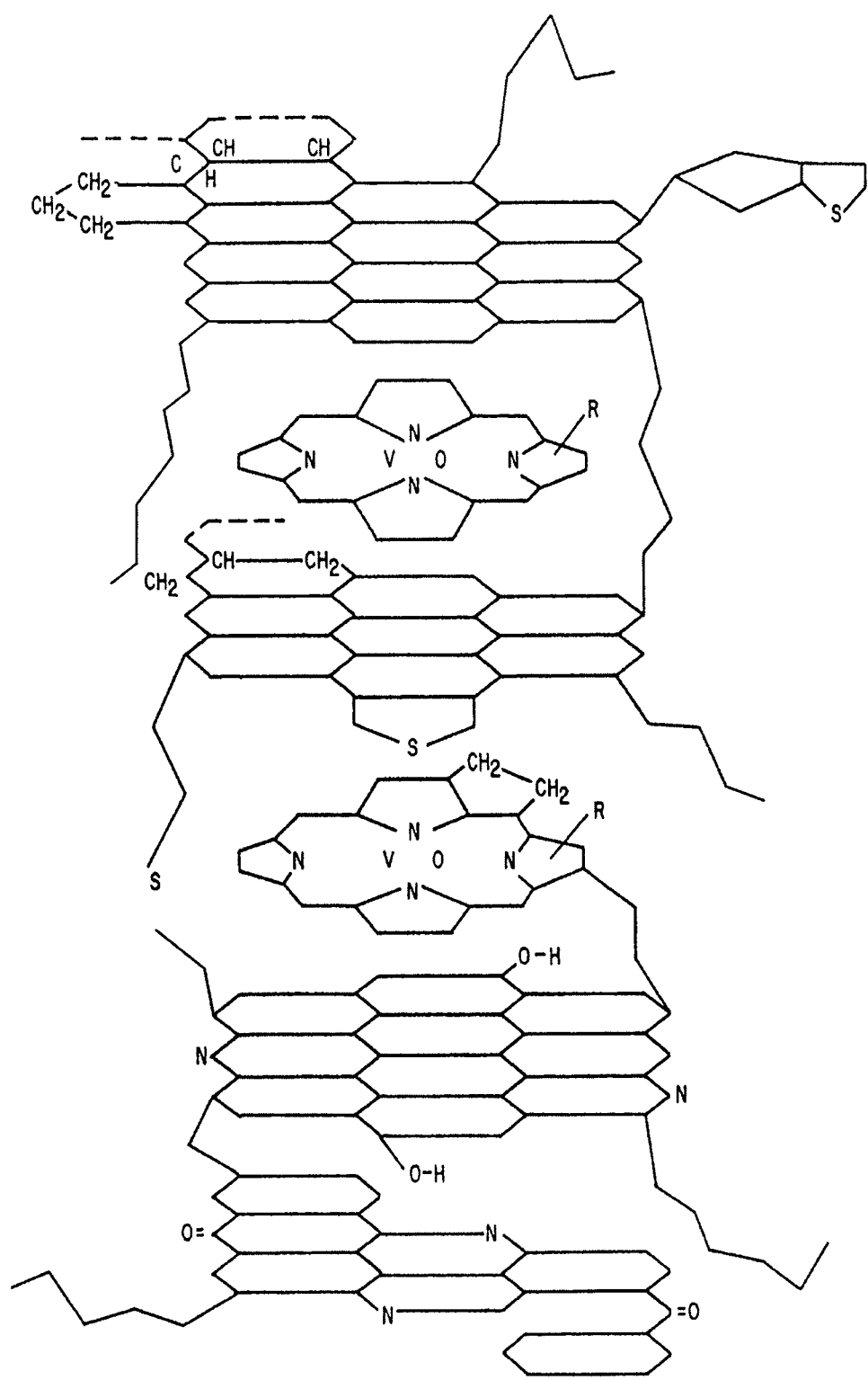
FIG. 1 depicts a hypothetical chemical structure for an asphaltene molecule.

The present invention relates to methods and systems for achieving through dispersion of a hydrocarbon-soluble catalyst precursor within a heavy oil feedstock. Once dispersed down to the molecular level, the catalyst precursor is caused to decompose upon heating to form a hydroprocessing molybdenum sulfide catalyst in the heavy oil feedstock. The catalyst precursor includes metal cations that are bonded with a plurality of organic anions to form an oil soluble metal salt (e.g., molybdenum salt). The oil soluble metal salts are manufactured in the presence of a reducing agent to obtain the molybdenum atoms in the desired oxidation state.

The terms "colloidal catalyst" and "colloidally-dispersed catalyst" shall refer to catalyst particles having a particle size that is colloidal in size, e.g., less than about 100 nm in diameter, preferably less than about 10 nm in diameter, more preferably less than about 5 nm in diameter, and most preferably less than about 1 nm in diameter. The term "colloidal catalyst" includes, but is not limited to, molecular or molecularly-dispersed catalyst compounds.

The terms "molecular catalyst" and "molecularly-dispersed catalyst" shall refer to catalyst compounds that are essentially "dissolved" or completely dissociated from other catalyst compounds or molecules in a heavy oil hydrocarbon feedstock, non-volatile liquid fraction, bottoms fraction, resid, or other feedstock or product in which the catalyst may be found. It shall also refer to very small catalyst particles that only contain a few catalyst molecules joined together (e.g., 15 molecules or less).

The terms "blended feedstock composition" and "conditioned feedstock composition" shall refer to a heavy oil feedstock into which an oil soluble catalyst precursor composition has been combined and mixed sufficiently so that, upon decomposition of the catalyst precursor and formation of the catalyst, the catalyst will comprise a colloidal and/or molecular catalyst dispersed within the feedstock.

The term "heavy oil feedstock" shall refer to heavy crude, oils sands bitumen, bottom of the barrel and resid left over from refinery processes (e.g., visbreaker bottoms), and any other lower quality material that contains a substantial quantity of high boiling hydrocarbon fractions (e.g., that boil at or above 343° C. (650° F.), more particularly at or above about 524° C. (975° F.)), and/or that include a significant quantity of asphaltenes that can deactivate a solid supported catalyst and/or cause or result in the formation of coke precursors and sediment. Examples of heavy oil feedstocks include, but are not limited to, Lloydminster heavy oil, Cold Lake bitumen, Athabasca bitumen, atmospheric tower bottoms, vacuum tower bottoms, residuum (or "resid"), resid pitch, vacuum residue, and nonvolatile liquid fractions that remain after subjecting crude oil, bitumen from tar sands, liquefied coal, or coal tar feedstocks to distillation, hot separation, and the like and that contain higher boiling fractions and/or asphaltenes.

The term "asphaltene" shall refer to the fraction of a heavy oil feedstock that is typically insoluble in paraffinic solvents such as propane, butane, pentane, hexane, and heptane and that includes sheets of condensed ring compounds held together by hetero atoms such as sulfur, nitrogen, oxygen and metals. Asphaltenes broadly include a wide range of complex compounds having anywhere from 80 to 160,000 carbon atoms, with predominating molecular weights, as determined by solution techniques, in the 5000 to 10,000 range. About 80-90% of the metals in the crude oil are contained in the asphaltene fraction which, together with a higher concentration of non-metallic hetero atoms, renders the asphaltene molecules more hydrophilic and less hydrophobic than other hydrocarbons in crude. A hypothetical asphaltene molecule structure developed by A. G. Bridge and co-workers at Chevron is depicted in FIG. 1.

The desired colloidal and/or molecular catalyst is typically formed in situ within the heavy oil feedstock prior to, or upon commencing, hydroprocessing of the feedstock. The oil soluble catalyst precursor comprises an organo-metallic compound or complex, which is advantageously blended with and thoroughly dispersed within the heavy oil feedstock in order to achieve a very high dispersion of the catalyst precursor within the feedstock prior to heating, decomposition, and formation of the final catalyst. An exemplary catalyst precursor is a molybdenum 2-ethylhexanoate complex containing approximately 15% by weight molybdenum.

Figure 2:
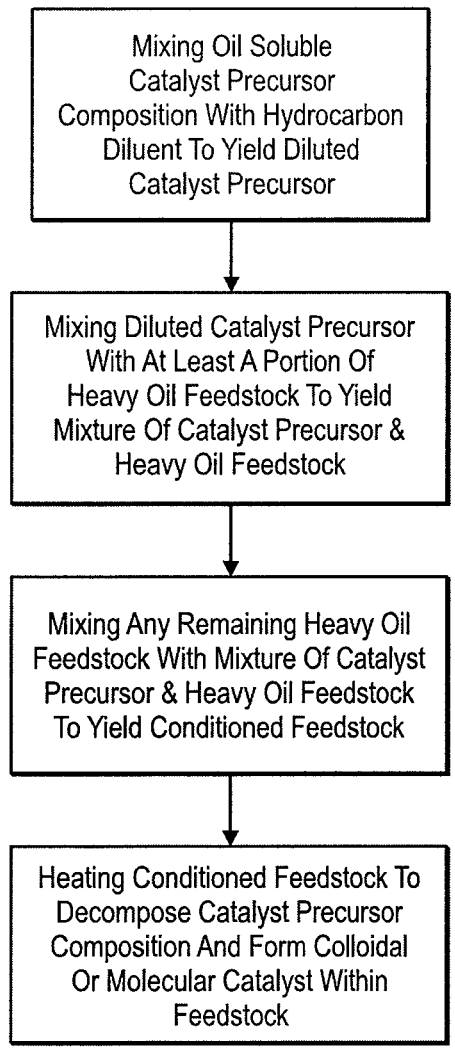
FIG. 2 is a flow diagram that schematically illustrates an exemplary process for preparing a heavy oil feedstock to include a colloidal or molecular catalyst dispersed therein.

In order to ensure thorough mixing of the catalyst precursor within the heavy oil feedstock, the catalyst precursor can be mixed into the heavy oil feedstock through a multi-step blending process, as shown in FIG. 2. The oil soluble catalyst precursor is pre-blended with a hydrocarbon oil diluent (e.g., vacuum gas oil, decant oil, cycle oil, or light gas oil) to create a diluted catalyst precursor, which is thereafter blended with at least a portion of the heavy oil feedstock so as to form a mixture of the catalyst precursor and the heavy oil feedstock. This mixture is blended with any remaining heavy oil feedstock in such a way so as to result in the catalyst precursor being homogeneously dispersed down to the molecular level within the heavy oil feedstock. The blended feedstock composition may then be heated to decompose the catalyst precursor, forming a colloidal or molecular catalyst within the heavy oil feedstock.

II. Exemplary Mixing Systems and Methods

Figure 3:
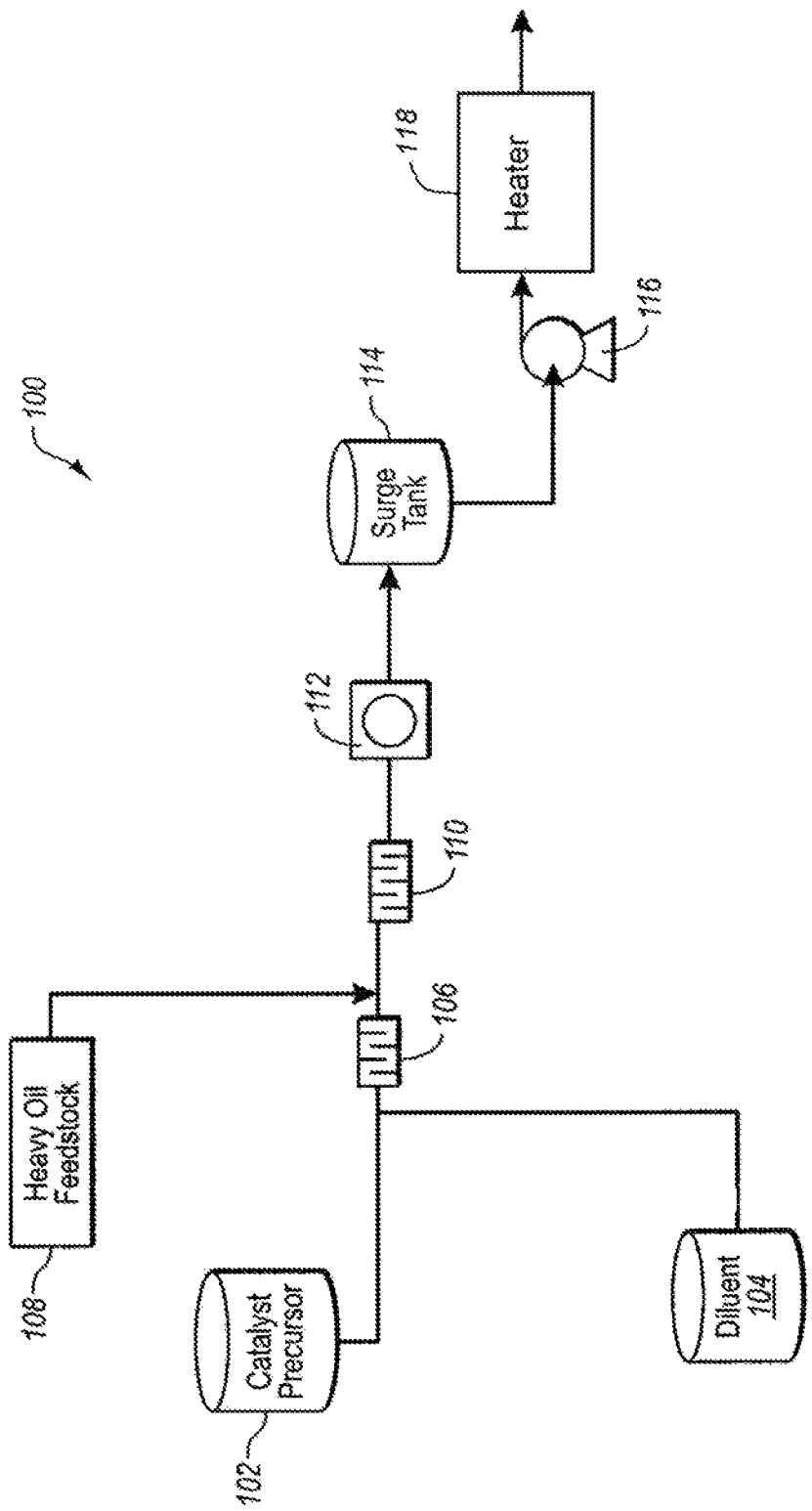
FIG. 3 schematically illustrates an exemplary system for mixing a catalyst precursor into a heavy oil feedstock according to the present invention.

FIG. 3 schematically illustrates an exemplary system 100 for intimately mixing a catalyst precursor composition 102 within a heavy oil feedstock 108 so as to result in the catalyst precursor being dispersed on a colloidal and/or molecular level within the heavy oil feedstock 108. The oil soluble catalyst precursor 102 preferably has a decomposition temperature in a range from about 100° C. (212° F.) to about 350° C. (662° F.), more preferably in a range of about 110° C. (230° F.) to about 300° C. (572° F.), and most preferably in a range of about 120° C. (248° F.) to about 250° C. (482° F.). Examples of exemplary catalyst precursor compositions include organometallic complexes or compounds, more specifically, oil soluble compounds or complexes of transition metals and organic acids. A currently preferred catalyst precursor is molybdenum 2-ethylhexanoate containing 15% by weight molybdenum and having a decomposition temperature or range high enough to avoid substantial decomposition when mixed with a heavy oil feedstock at a temperature below about 250° C. (482° F.). Other exemplary precursor compositions include, but are not limited to, molybdenum octoate, molybdenum hexanoate, molybdenum naphthanate, vanadium naphthanate, vanadium octoate, molybdenum hexacarbonyl, vanadium hexacarbonyl, and iron pentacarbonyl.

Catalyst precursor 102 advantageously is first mixed with a hydrocarbon diluent 104 by means of a first static in-line low shear mixer 106 to advantageously form a diluted catalyst precursor composition. Examples of suitable hydrocarbon diluents 104 include, but are not limited to, start up diesel (which typically has a boiling range of about 150° C. or higher), vacuum gas oil (which typically has a boiling range of 360-524° C.) (680-975° F.), decant oil or cycle oil (which typically has a boiling range of 360°-550° C.) (680-1022° F.), and/or light gas oil (which typically has a boiling range of 200°-360° C.) (392-680° F.). In some embodiments, it may be possible to dilute the catalyst precursor composition with a small portion of the heavy oil feedstock. Although the diluent may contain a substantial fraction of aromatic components, this is not required in order to keep the asphaltene fraction of the feedstock in solution, as the well dispersed catalyst is able to hydrocrack the asphaltenes within the heavy oil feedstock as well as the other components of the feedstock.

The weight ratio of catalyst precursor composition 102 to hydrocarbon oil diluent 104 is preferably in a range of about 1:500 to about 1:1, more preferably in a range of about 1:150 to about 1:2, and most preferably in a range of about 1:100 to about 1:5 (e.g., 1:100, 1:80, 1:50, 1:30, or 1:10).

The catalyst precursor composition 102 is advantageously mixed with the hydrocarbon diluent 104 at a temperature below which a significant portion of the catalyst precursor composition 102 starts to decompose, preferably, at temperature in a range of about 25° C. (77° F.) to about 300° C. (572° F.), more preferably in range of about 50° C. (122° F.) to about 200° C. (392° F.), and most preferably in a range of about 75° C. (167° F.) to about 150° C. (302° F.), to form the diluted precursor mixture. It will be appreciated that the actual temperature at which the diluted precursor mixture is formed typically depends largely on the decomposition temperature of the particular precursor composition that is used.

The degree of initial mixing achieved within in-line mixer 106 is dependent, at least in part, on the number of stages within the low shear, in-line static mixer. In one embodiment, mixer 106 is characterized as including between about 2 and about 20 stages, preferably between about 7 and about 15 stages, and more preferably between about 8 and about 12 stages. In mixing theory, a stage is substantially equivalent to having a vessel that is vigorously stirred. Because mixing is not perfect (i.e., there is some short circuiting of the vessel by the components to be mixed), the degree of mixing is improved if a series of mixing vessels (i.e., stages)

are used. An exemplary in-line static mixer 106 includes no moving parts, but rather includes a plurality of internal baffles or other elements inside of a tube or other housing. The internal baffles or other elements channel the flowing fluid in many different directions by repeatedly dividing and recombining the fluid in a turbulent manner so as to mix the various components. The number of stages in a static mixer empirically correlates the degree of mixing that can be expected within the static mixer when compared to the degree of mixing that would occur if using a series of mixing vessels (i.e., the fluid leaving the first vessel enters the second vessel for mixing, the fluid leaving the second vessel enters the third vessel, and so on). In other words, a static mixer characterized as including 10 stages provides a degree of mixing that is substantially equivalent to that provided by a mixing system comprising a series of 10 mixing vessels.

Diluting the catalyst precursor with a diluent prior to mixing with the heavy oil feedstock is helpful in achieving thorough blending of the precursor composition within the heavy oil feedstock because the hydrocarbon oil diluent is more easily blended with the heavy oil feedstock than the catalyst precursor by itself. It is important that the catalyst precursor be pre-mixed with the diluent and that care be taken in the overall method and mixing system to mix the components for a time sufficient to thoroughly blend the precursor composition within the feedstock before substantial decomposition of the precursor composition has occurred. For example, U.S. Pat. No. 5,578,197 to Cyr et al., the disclosure of which is incorporated by reference, describes a method whereby molybdenum 2-ethyl hexanoate was mixed with bitumen vacuum tower residuum and a solvent for 24 hours before the resulting mixture was heated in a reaction vessel to form the catalyst compound and to effect hydrocracking (see col. 10, lines 4-43). Whereas 24-hour mixing in a testing environment may be entirely acceptable, such long mixing times may make certain industrial operations prohibitively expensive. Pre-mixing the catalyst precursor with a diluent so that the catalyst precursor is substantially homogeneously dispersed throughout the diluted catalyst precursor is tremendously advantageous in reducing the required mixing times to achieve the desired dispersion throughout the heavy oil feedstock. It will be apparent to one skilled in the art that the continuous flow systems of FIGS. 3 and 4 that include pre-mixing the catalyst precursor with the diluent as described herein provide clear advantages over the method as described by the Cyr et al. patent, particularly in a commercial operation environment.

Advantageously, it has been found that pre-blending the precursor composition 102 with a hydrocarbon diluent 104 prior to blending the diluted precursor mixture with the heavy oil feedstock 108 greatly aids in thoroughly and intimately blending the precursor composition 102 within feedstock 108, particularly in the relatively short period of time required for large-scale industrial operations to be economically viable. Forming a diluted precursor mixture advantageously shortens the overall mixing time by (1) reducing or eliminating differences in solubility between the more polar catalyst precursor 102 and the heavy oil feedstock 108, (2) reducing or eliminating differences in rheology between the catalyst precursor composition 102 and the heavy oil feedstock 108, and/or (3) breaking up bonds or associations between clusters of catalyst precursor molecules to form a solute within hydrocarbon oil diluent 104 that is much more easily dispersed within the heavy oil feedstock 108.

It is particularly advantageous to first form a diluted precursor mixture in the case where the heavy oil feedstock 108 contains water (e.g., condensed water). Otherwise, the greater affinity of the water for the polar catalyst precursor composition 102 can cause localized agglomeration of the precursor composition 102, resulting in poor dispersion and formation of micron-sized or larger catalyst particles. The hydrocarbon oil diluent 104 is preferably substantially water free (i.e., contains less than about 0.5% water) to prevent the formation of substantial quantities of micron-sized or larger catalyst particles.

The diluted precursor mixture is then combined with heavy oil feedstock 108 and mixed for a time sufficient and in a manner so as to disperse the catalyst precursor composition throughout the feedstock in order to yield a blended feedstock composition in which the precursor composition is thoroughly mixed within the heavy oil feedstock. In the illustrated system 100, heavy oil feedstock 108 and the diluted catalyst precursor are blended in a second low shear, static in-line mixer 110. Similar to first mixer 106, second mixer 110 preferably is characterized as including between about 2 stages and about 20 stages, more preferably between about 7 stages and about 15 stages, and most preferably between about 8 and about 12 stages.

Second in-line static mixer 110 is followed by further mixing within dynamic, high shear mixer 112 (e.g., a vessel with a propeller or turbine impeller for providing oz very turbulent, high shear mixing). One example of a suitable dynamic high shear mixer is the 800LS in-line mixer, manufactured by Silverson Machines, Ltd., located in Waterside, England. In order to obtain sufficient mixing of the catalyst precursor composition within the heavy oil feedstock so as to yield a colloidal and/or molecular catalyst upon decomposition of the precursor composition, the diluted precursor mixture and heavy oil feedstock 108 are preferably mixed for a time period in a range of about 0.001 second to about 20 minutes, more preferably in a range from about 0.005 second to about 20 seconds, and most preferably in a range of about 0.01 second to about 3 seconds. Mixing time in the static low shear mixer depends on the number of stages and the volumetric flow of the components. Increasing the vigorousness and/or shearing energy of the mixing process within high shear mixer 112 generally reduces the mixing time required to effect thorough mixing within high shear mixer 112. The mixing time in the static in-line mixer 110 may advantageously comprise a majority of the total mixing time. Such a configuration uses the pressure drop of static mixer 110 to advantageously achieve a degree of mixing, followed or preceded by additional mixing within high shear mixer 112. It is currently preferred for the high shear mixer 112 to follow in-line mixer 110. For example, an exemplary large commercial scale operation may achieve an adequate degree of mixing with between about 0.03 and about 0.5 second in the dynamic high shear mixer, with the in-line static mixer 110 having a mixing residence time greater than that of the high shear mixer 112.

It has been found that systems including a static in-line mixer followed by a dynamic high shear mixer advantageously provide for very thorough mixing of the diluted catalyst precursor stream and the heavy oil feedstock 108. Although such a configuration may be preferred, other mixing configurations may also be used. For example, another mixing configuration may include one or more dynamic high shear mixers alone; multiple static in-line mixers; or multiple static in-line mixers in combination with one or more in-line high shear mixers.

Additional apparatus may be included downstream within the system for providing even more mixing of the catalyst precursor so as to effect colloidal and/or molecular dispersion of the catalyst precursor within the heavy oil feedstock. For example, the static in-line mixer 110 and dynamic high shear mixer 112 (or another mixing apparatus configuration) may be followed by a pump around in surge tank 114, and/or one or more multi-stage centrifugal pumps. According to one embodiment, continuous (as opposed to batch) mixing can be carried out using high energy pumps having multiple chambers within which the catalyst precursor composition and heavy oil feedstock are churned and mixed as part of the pumping process itself used to deliver a conditioned heavy oil feedstock to a hydroprocessing reactor system. The foregoing alternative mixing apparatus configurations may also be used for the pre-mixing process discussed above in which the catalyst precursor composition 102 is mixed with the hydrocarbon oil diluent 104 to form a diluted catalyst precursor mixture.

In one embodiment, rather than mixing the diluted precursor mixture with all of heavy oil feedstock 108 at once, only a portion of heavy oil feedstock 108 may initially be mixed with the diluted catalyst precursor. For example, the diluted catalyst precursor may be mixed with a fraction of the heavy oil feedstock, the resulting mixed heavy oil feedstock can be mixed in with another fraction of the heavy oil feedstock, and so on until all of the heavy oil feedstock has been mixed with the diluted catalyst precursor. For example, one such progressive mixing method may initially mix in 20% of the heavy oil feedstock, then mix in 40% of the heavy oil feedstock (for a total of 60%), after which the remaining 40% of the heavy oil feedstock may be mixed in. In such a progressive mixing method, the heavy oil feedstock may be divided and added as two fractions, three fractions, or more. One particularly suitable progressive mixing method including a heavy oil feedstock divided into two fractions is described in conjunction with FIG. 4, below. Preferably, the heavy oil feedstock is divided into as few fractions as possible while still achieving very thorough mixing of the catalyst precursor within the feedstock, as increasing the number of fractions, streams, and mixing steps increases the operational cost and complexity of the system and method. The progressive mixing method including two fractions as described in conjunction with FIG. 4 has been found to result in very thorough mixing of the catalyst precursor within the heavy oil feedstock.

In the case of heavy oil feedstocks that are solid or extremely viscous at room temperature, such feedstocks may advantageously be heated in order to soften them and create a feedstock having sufficiently low viscosity so as to allow good mixing of the oil soluble catalyst precursor into the feedstock. In general, decreasing the viscosity of the heavy oil feedstock will reduce the time required to effect thorough and intimate mixing of the oil soluble precursor composition within the feedstock. However, the feedstock should not be heated to a temperature above which significant decomposition of the catalyst precursor composition occurs until after the catalyst precursor is thoroughly dispersed throughout the feedstock composition. Prematurely decomposing the catalyst precursor composition generally results in the formation of micron-sized or larger catalyst particles rather than a colloidal or molecular catalyst. The heavy oil feedstock and diluted catalyst precursor mixture are preferably mixed at a temperature in a range of about 25° C. (77° F.) to about 300° C. (572° F.), more preferably in a range of about 50° C. (122° F.) to about 200° C. (392° F.), and most preferably in a range of about 75° C. (167° F.) to about 150° C. (302° F.) to yield the blended feedstock composition.

The stream of conditioned heavy oil feedstock (i.e., a substantially homogeneously blended stream including catalyst precursor 102 thoroughly mixed throughout heavy oil feedstock 108) exiting from high shear mixer 112 is introduced into surge tank 114. Through molecular diffusion, the catalyst precursor 102 within surge tank 114 continues to diffuse even more completely throughout heavy oil feedstock 108. Finally, the conditioned feedstock is pumped out of surge tank 114 through pump 116 and delivered to a reactor system for hydroprocessing of the heavy oil feedstock. The conditioned heavy oil feedstock may optionally pass from pump 116 to a heater 118 in order to heat the conditioned feedstock to cause decomposition of the catalyst precursor, liberate the catalyst metal therefrom, and form the active catalyst. As described above, pump 116 may advantageously comprise a multi-stage high pressure pump. Because of the multiple compression stages, such a pump provides further intense mixing of the conditioned feedstock, ensuring thorough mixing of catalyst precursor 102 within feedstock 108 if such mixing has not already been accomplished. The result is that the blended feedstock composition delivered to the hydroprocessing reactor system includes the catalyst precursor dispersed throughout the heavy oil feedstock down to the molecular level, such that upon heating and decomposition of the precursor to form the catalyst, the formed catalyst is advantageously colloidal or molecular in size.

Figure 4:
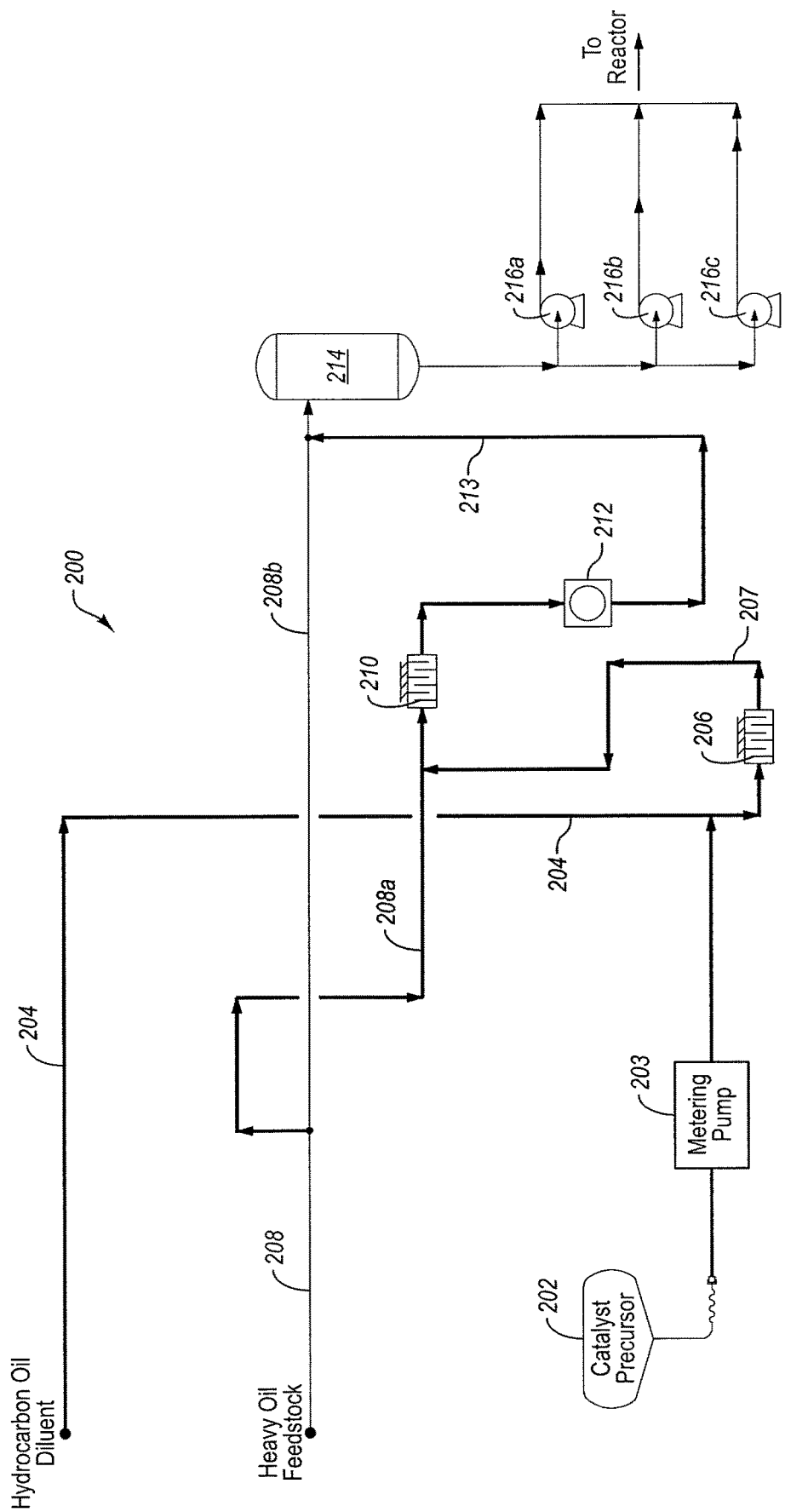
FIG. 4 schematically illustrates another exemplary system for mixing a catalyst precursor into a heavy oil feedstock according to the present invention.

FIG. 4 schematically illustrates another exemplary system 200 for intimately mixing a catalyst precursor composition 202 within a heavy oil feedstock 208 so as to result in the catalyst precursor being dispersed on a molecular level within the heavy oil feedstock 208. Catalyst precursor 202 is metered through metering pump 203 so as to advantageously deliver a desired flow of catalyst precursor 202. Catalyst precursor 202 advantageously is then mixed with a diluent 204 within a first static in-line low shear mixer 206 to form a diluted catalyst precursor composition 207. Hydrocarbon diluent 204 may comprise decant oil, vacuum gas oil, light gas oil, cycle oil and/or start up diesel.

The weight ratio of catalyst precursor composition 202 to hydrocarbon oil diluent 204 is preferably in a range of about 1:500 to about 1:1, more preferably in a range of about 1:150 to about 1:2, and most preferably in a range of about 1:100 to about 1:5 (e.g., 1:100, 1:80, 1:50, 1:30, or 1:10).

The catalyst precursor composition 202 is advantageously mixed with the hydrocarbon diluent 204 at a temperature below which a significant portion of the catalyst precursor composition 202 starts to decompose. Advantageously, it has been found that pre-blending the precursor composition 202 with a hydrocarbon diluent 204 prior to blending the diluted precursor mixture 207 with the heavy oil feedstock 208 greatly aids in thoroughly and intimately blending the precursor composition 202 within feedstock 208 in the relatively short period of time required for large-scale industrial operations to be economically viable, particularly if the mixing system is a continuous flow process (as opposed to a batch process). Forming a diluted precursor mixture 207 shortens the overall mixing time by (1) reducing or eliminating differences in solubility between the more polar catalyst precursor composition 202 and the heavy oil feedstock 208, (2) reducing or eliminating differences in rheology between the catalyst precursor composition 202 and the heavy oil feedstock 208, and/or (3) breaking up clusters of the catalyst precursor molecules to form a solute within hydrocarbon oil diluent 204 that is much more easily dispersed within the heavy oil feedstock 208.

It is particularly advantageous to first form a diluted precursor mixture in the case where the heavy oil feedstock 208 contains water (e.g., condensed water). Otherwise, the greater affinity of the water for the polar catalyst precursor composition 202 can cause localized agglomeration of the precursor composition 202, resulting in poor dispersion and formation of micron-sized or larger catalyst particles. The hydrocarbon oil diluent 204 is preferably substantially water free (i.e., contains less than about 0.5% water) to prevent the formation of substantial quantities of micron-sized or larger catalyst particles.

The diluted precursor mixture 207 is then combined with heavy oil feedstock 208 in a manner so as to disperse the catalyst precursor composition 202 throughout the feedstock in order to yield a conditioned feedstock composition in which the precursor composition 202 is thoroughly mixed within the heavy oil feedstock 208. In the illustrated system 200, heavy oil feedstock 208 is divided into two streams, 208a and 208b for progressive mixing with diluted catalyst precursor stream 207. In one example, stream 208 may be divided so that between about 10 and about 95 percent of the flow of stream 208 is contained within stream 208a, preferably between about 40 and about 80 percent, and more preferably between about 65 and about 75 percent of stream 208 is contained within stream 208a.

Diluted catalyst precursor stream 207 is advantageously blended with heavy oil feedstock stream 208a in a second low shear, static in-line mixer 210, which advantageously acts to begin mixing the diluted catalyst precursor into feedstock stream 208a. Effluent 211 from mixer 210 comprises a mixture of diluent 204, catalyst precursor 202, and a portion of heavy oil feedstock 208. The catalyst precursor within effluent 211 may not yet be colloidally and/or molecularly dispersed within the heavy oil feedstock. Effluent 211 is introduced into dynamic, high shear mixer 212 (e.g., a vessel with a propeller or turbine impeller for providing very turbulent, high shear mixing), which advantageously acts to intimately blend together the catalyst precursor and the heavy oil feedstock. The effluent 213 from high shear mixer 212 is introduced along with any remaining heavy oil feedstock 208b into surge tank 214.

It has been found that the specific configuration including a static in-line mixer followed by a dynamic high shear mixer advantageously provides for very thorough mixing of the diluted catalyst precursor stream 207 and the heavy oil feedstock 208a. Although such a configuration may be preferred, other mixing configurations may also be used. For example, another mixing configuration may include one or more dynamic high shear mixers alone; multiple static in-line mixers; or multiple static in-line mixers in combination with one or more in-line high shear mixers.

Additional apparatus may be included downstream within the system for providing even more thorough mixing of the catalyst precursor within the heavy oil feedstock. For example, the static in-line mixer 210 and dynamic high shear mixer 212 (or another mixing apparatus configuration) may be followed by a pump around in surge tank 214, and/or one or more high pressure multi-stage centrifugal pumps. Illustrated system 200 includes three pumps 216a-216c arranged in parallel, which will be discussed further below.

In the system of FIG. 4, only a portion of heavy oil feedstock 208 (i.e., stream 208a) is initially mixed with the diluted catalyst precursor 207. Although illustrated as dividing feedstream 208 into two streams 208a and 208b, it is to be understood that all of the heavy oil feedstream may be added at once (i.e., there may be no division of feedstream 208) or feedstream 208 may be divided into three or even more streams for progressively blending with the catalyst precursor. However, a system as illustrated in FIG. 4 where the feedstream is divided into two feedstreams is particularly advantageous as it has been found to achieve very thorough mixing of the catalyst precursor 202 within the feedstock 208, without unduly increasing the operational costs and complexity of the system and method.

At this point, the catalyst precursor has been intimately mixed throughout at least a portion of the heavy oil feedstock. Although not necessary, the stream of conditioned heavy oil feedstock 213 may be introduced along with any remaining heavy oil feedstock 208b into surge tank 214. Such a surge tank is typically associated with any downstream hydroprocessing reactor system. As such, the surge tank may advantageously be used to more fully diffuse the catalyst precursor throughout the heavy oil feedstock. Through molecular diffusion, the catalyst precursor 202 within surge tank 214 continues to diffuse even more completely throughout the heavy oil feedstock preparatory to heating and decomposition to form a colloidal or molecular catalyst. In order to provide sufficient diffusion time, surge tank 214 advantageously may provide a residence time between about 5 minutes and about 60 minutes, preferably between about 10 minutes and about 50 minutes, and more preferably between about 20 minutes and about 40 minutes. The nominal residence time of the surge tank may be more or less depending on the desired throughput of conditioned heavy oil feedstock.

Finally, the conditioned feedstock is pumped out of surge tank 214 through pumps 216a-216c and delivered to a reactor system for hydroprocessing of the heavy oil feedstock. Pumps 216a-216c may advantageously comprise multi-stage high pressure pumps. Because of the multiple compression stages (e.g., more than about ten), such pumps provide further intense mixing of the conditioned feedstock, ensuring thorough mixing of catalyst precursor 202 within feedstock 208. The result is that the conditioned feedstock delivered to the hydroprocessing reactor system includes the catalyst precursor dispersed throughout the heavy oil feedstock down to the molecular level, such that upon heating and decomposition of the precursor to form the catalyst, the formed catalyst is advantageously colloidal or molecular in size.

The illustrated embodiment advantageously includes three pumps in parallel (e.g., pumps 216a, 216b, and 216c). Because the pumps advantageously include multiple stages (e.g., more than about ten), the conditioned feedstock is intensely mixed as it passes through one of pumps 216a, 216b, or 216c. Configuring the system so that pumps 216a-216c are in parallel provides for increased flow rate of conditioned feedstock being delivered to a downstream hydroprocessing reactor system. In alternative embodiments, pumps may be situated so as to be in series or a combination of series and parallel pumps. Placing pumps in series effectively increases the number of intense mixing stages through which the conditioned feedstock passes. For example, two pumps in series each including five stages could be used instead of a single pump including ten stages to achieve substantially the same intimate mixing of the catalyst precursor within the heavy oil feedstock so as to yield a conditioned feedstock. In either configuration, the result is that the catalyst precursor is homogeneously dispersed on a colloidal and/or molecular level within the feedstock so that upon heating, formation of a colloidal and/or molecular catalyst results.

The inventive mixing system advantageously maintains the catalyst precursor composition at a temperature below the decomposition temperature of the catalyst precursor throughout the mixing process. As such, the catalyst precursor composition resists substantial premature decomposition before intimate mixing of the catalyst precursor composition within the heavy oil feedstock has been achieved. Subsequent heating of the feedstock to a temperature sufficient to cause the release of hydrogen sulfide from sulfur-bearing hydrocarbon molecules, either before or upon commencing hydroprocessing, causes the catalyst precursor that has been intimately mixed with the feedstock to yield individual metal sulfide catalyst molecules and/or extremely small particles that are colloidal in size (i.e., less than 100 nm, preferably less than about 10 nm, more preferably less than about 5 nm, and most preferably less than about 1 nm).

After the catalyst precursor composition has been well-mixed throughout the heavy oil feedstock so as to yield the blended feedstock composition, this composition is then heated to above the temperature where significant decomposition of the catalyst precursor composition occurs in order to liberate the catalyst metal therefrom so as to form the final active catalyst. According to one embodiment, the metal from the precursor composition is believed to first form a metal oxide, which then reacts with sulfur liberated from the heavy oil feedstock to yield a metal sulfide compound that is the final active catalyst. In the case where the heavy oil feedstock includes sufficient or excess sulfur, the final activated catalyst may be formed in situ by heating the conditioned heavy oil feedstock to a temperature sufficient to liberate the sulfur therefrom. In some cases, sulfur may be liberated at the same temperature that the precursor composition decomposes. In other cases, further heating to a higher temperature may be required.

According to one embodiment, metal catalyst atoms liberated from the organo-metallic precursor compound or complex react with sulfur liberated from the heavy oil feedstock during heating to yield metal catalyst compounds that comprise one or more types of metal sulfides. A non-limiting example of a useful metal sulfide catalyst that may be employed in the methods and systems according to the invention is molybdenum disulfide. A non-limiting example of a catalyst precursor used to form molybdenum disulfide is molybdenum 2-ethyl hexanoate.

The colloidal or molecular catalyst generally never becomes deactivated because it is not contained within the pores of a support material. Moreover, because of intimate contact with the heavy oil molecules, the molecular catalyst and/or colloidal catalyst particles can rapidly catalyze a hydrogenation reaction between hydrogen atoms and free radicals formed from the heavy oil molecules. Although the molecular or colloidal catalyst leaves the hydroprocessing reactor with the upgraded product, it is constantly being replaced with fresh catalyst contained in the incoming feedstock. As a result, process conditions, throughput and conversion levels remain significantly more constant over time compared to processes that employ solid supported catalysts as the sole hydroprocessing catalyst. Moreover, because the colloidal or molecular catalyst is more freely dispersed throughout the feedstock, including being intimately associated with asphaltenes, conversion levels and throughput can be significantly or substantially increased compared to conventional hydroprocessing systems.

The uniformly dispersed colloidal and/or molecular catalyst is also able to more evenly distribute the catalytic reaction sites throughout the reaction chamber and feedstock material. This reduces the tendency for free radicals to react with one another to form coke precursor molecules and sediment compared to ebullated bed reactors that only use a relatively large (e.g., ¼"×⅛" or ¼"×¹⁄₁₆") (6.35 mm×3.175 mm or 6.35 mm×1.5875 mm) supported catalyst, wherein the heavy oil molecules must diffuse into the pores of the catalyst support to reach the active catalyst sites. As will be apparent to one skilled in the art, a typical ebullated bed reactor inherently has catalyst free zones at the reactor bottom (plenum) and from above the expanded catalyst level to the recycle cup. In these catalyst free zones the heavy oil molecules continue undergoing thermal cracking reactions so as to form free radicals that may react with one another to produce coke precursor molecules and sediment.

The benefits resulting from the inventive mixing systems as related to downstream hydroprocessing reactor systems include increased hydrogen transfer to cracked hydrocarbon molecules enabling higher conversion levels and throughput, reduced pressure drop in the case of fixed-bed reactors, reduced catalyst fouling, slowing of the rate of increasing reactor temperature in fixed bed hydroprocessing to compensate for catalyst deactivation that may otherwise occur, and/or reducing the frequency of shutting down the fixed bed reactor to replace the solid supported catalyst.

If the oil soluble catalyst precursor is thoroughly mixed throughout the heavy oil feedstock, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the precursor composition throughout the feedstock will yield individual catalyst molecules rather than colloidal particles. Simply mixing, while failing to sufficiently blend, the catalyst precursor composition with the feedstock typically causes formation of large agglomerated metal sulfide compounds that are micron-sized or larger.

In order to form the metal sulfide catalyst, the blended feedstock composition is preferably heated to a temperature in a range of about 200° C. (392° F.) to about 500° C. (932° F.), more preferably in a range of about 250° C. (482° F.) to about 450° C. (842° F.), and most preferably in a range of about 300° C. (572° F.) to about 400° C. (752° F.). According to one embodiment, the conditioned feedstock is heated to a temperature that is about 100° C. (212° F.) less than the hydrocracking temperature within the hydrocracking reactor, preferably about 50° C. (122° F.) less than the hydrocracking temperature. According to one embodiment, the colloidal or molecular catalyst is formed during preheating before the heavy oil feedstock is introduced into the hydrocracking reactor. According to another embodiment, at least a portion of the colloidal or molecular catalyst is formed in situ within the hydrocracking reactor itself. In some cases, the colloidal or molecular catalyst can be formed as the heavy oil feedstock is heated to a hydrocracking temperature prior to or after the heavy oil feedstock is introduced into a hydrocracking reactor. The initial concentration of the catalyst metal in the colloidal or molecular catalyst is preferably in a range of about 5 parts per million (ppm) to about 500 ppm by weight of the heavy oil feedstock, more preferably in a range of about 15 ppm to about 300 ppm, and most preferably in a range of about 25 ppm to about 175 ppm. The catalyst may become more concentrated as volatile fractions are removed from a non-volatile resid fraction.

Figure 5:
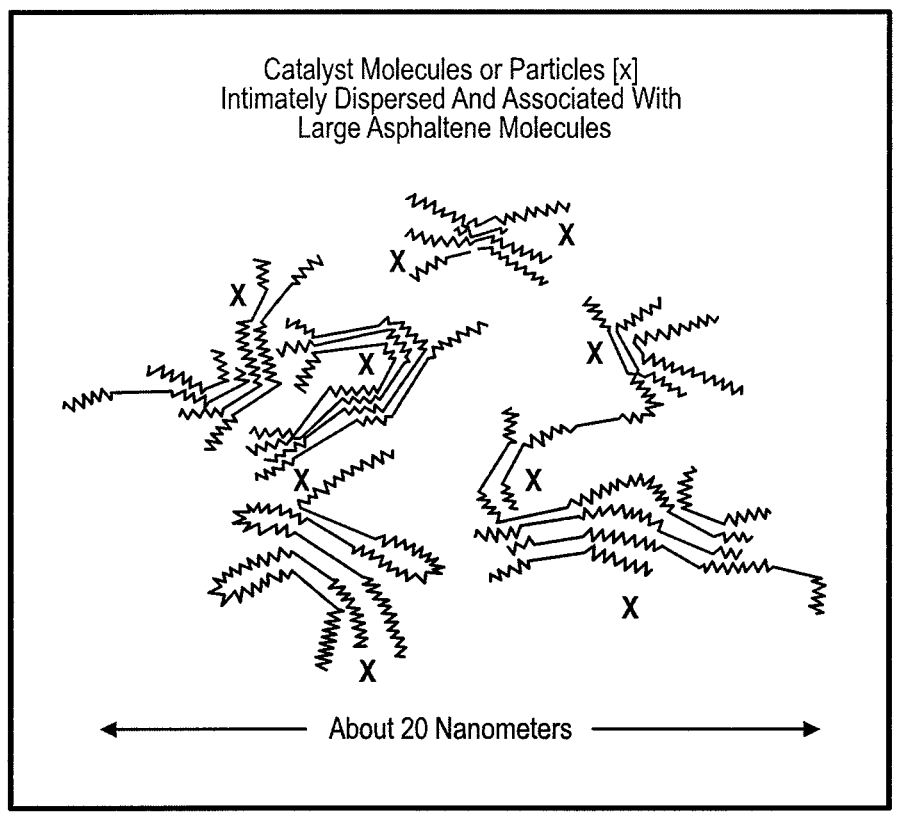
FIG. 5 schematically illustrates catalyst molecules or colloidal-sized catalyst particles associated with asphaltene molecules.

Notwithstanding the generally hydrophobic nature of heavy oil feedstocks, because asphaltene molecules generally have a large number of oxygen, sulfur and nitrogen functional groups, as well as associated metal constituents such as nickel and vanadium, the asphaltene fraction is significantly less hydrophobic and more hydrophilic than other hydrocarbons within the feedstock. Asphaltene molecules therefore generally have a greater affinity for the polar metal sulfide catalyst, particularly when in a colloidal or molecular state, compared to more hydrophobic hydrocarbons in a heavy oil feedstock. As a result, a significant portion of the polar metal sulfide molecules or colloidal particles tend to become associated with the more hydrophilic and less hydrophobic asphaltene molecules compared to the more hydrophobic hydrocarbons in the feedstock. The close proximity of the catalyst particles or molecules to the asphaltene molecules helps promote beneficial upgrading reactions involving free radicals formed through thermal cracking of the asphaltene fraction. This phenomenon is particularly beneficial in the case of heavy oils that have a relatively high asphaltene content, which are otherwise difficult, if not impossible, to upgrade using conventional hydroprocessing techniques due to the tendency of asphaltenes to deactivate porous supported catalysts and deposit coke and sediments on or within the processing equipment. FIG. 5 schematically depicts catalyst molecules, or colloidal particles "X" associated with, or in close proximity to, the asphaltene molecules.

While the highly polar nature of the catalyst compound causes or allows the colloidal and/or molecular catalyst to associate with asphaltene molecules, it is the general incompatibility between the highly polar catalyst compound and the hydrophobic heavy oil feedstock that necessitates the aforementioned intimate or thorough mixing of the oil soluble catalyst precursor composition within the heavy oil feedstock prior to decomposition of the precursor and formation of the colloidal or molecular catalyst. Because metal catalyst compounds are highly polar, they cannot be effectively dispersed within a heavy oil feedstock in colloidal or molecular form if added directly thereto or as part of an aqueous solution or an oil and water emulsion. Such methods inevitably yield micron-sized or larger catalyst particles.

Figure 6A:
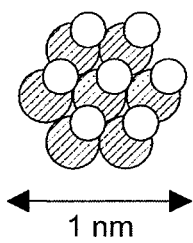
FIGS. 6A and 6B schematically depict top and side views respectively of a molybdenum disulfide crystal approximately 1 nm in size.
Figure 6B:
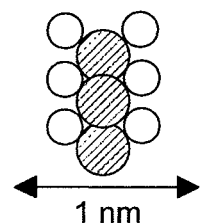
Figure 4:
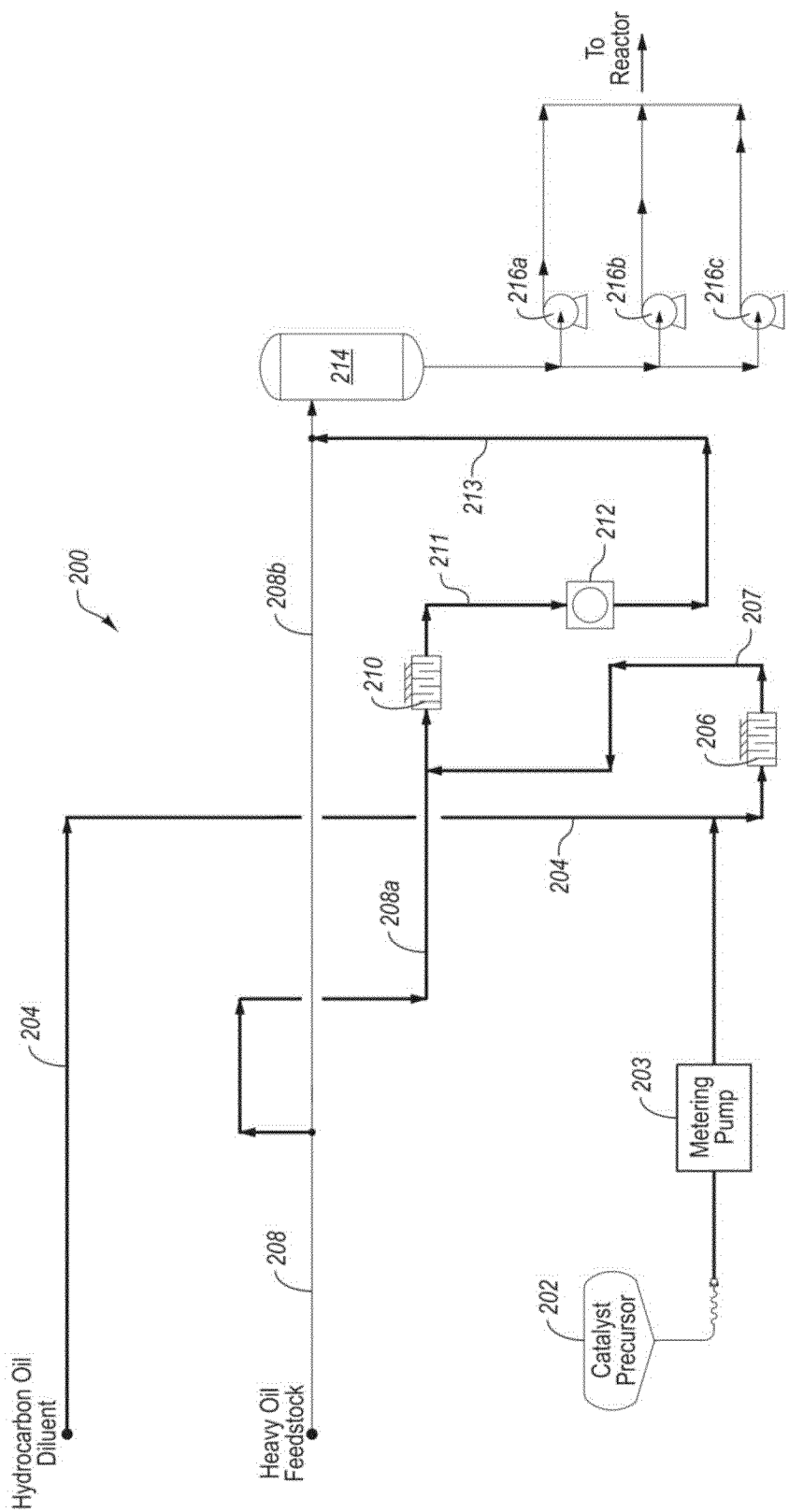

Reference is now made to FIGS. 6A and 6B, which schematically depict a nanometer-sized molybdenum disulfide crystal. FIG. 6A is a top view, and FIG. 6B is a side view of a molybdenum disulfide crystal. Molecules of molybdenum disulfide typically form flat, hexagonal crystals in which single layers of molybdenum (Mo) atoms are sandwiched between layers of sulfur (S) atoms. The only active sites for catalysis are on the crystal edges where the molybdenum atoms are exposed. Smaller crystals have a higher percentage of molybdenum atoms exposed at the edges.

The diameter of a molybdenum atom is approximately 0.3 nm, and the diameter of a sulfur atom is approximately 0.2 nm. The illustrated nanometer-sized crystal of molybdenum disulfide has 7 molybdenum atoms sandwiched in between 14 sulfur atoms. As best seen in FIG. 6A, 6 out of 7 (85.7%) of the total molybdenum atoms will be exposed at the edge and available for catalytic activity. In contrast, a micron-sized crystal of molybdenum disulfide has several million atoms, with only about 0.2% of the total molybdenum atoms being exposed at the crystal edge and available for catalytic activity. The remaining 99.8% of the molybdenum atoms in the micron-sized crystal are embedded within the crystal interior and are therefore unavailable for catalysis. This means that nanometer-sized molybdenum disulfide particles are, at least in theory, orders of magnitude more efficient than micron-sized particles in providing active catalyst sites.

In practical terms, forming smaller catalyst particles results in more catalyst particles and more evenly distributed catalyst sites throughout the feedstock. Simple mathematics dictates that forming nanometer-sized particles instead of micron-sized particles will result in approximately $1000^3$ (i.e., 1 million) to $1000^6$ (i.e., 1 billion) times more particles depending on the size and shape of the catalyst crystals. That means there are approximately 1 million to 1 billion times more points or locations within the feedstock where active catalyst sites reside. Moreover, nanometer-sized or smaller molybdenum disulfide particles are believed to become intimately associated with asphaltene molecules, as shown in FIG. 5. In contrast, micron-sized or larger catalyst particles are believed to be far too large to become intimately associated with or within asphaltene molecules. For at least these reasons, the distinct advantages associated with the mixing method and system that provides for formation of a colloidal and/or molecular catalyst will be apparent to one skilled in the art.

III. Examples

The following examples more particularly illustrate some exemplary mixing methods and mixing systems according to the present invention for intimately mixing a catalyst precursor into a heavy oil feedstock so as to yield a conditioned heavy oil feedstock.

Example 1

A blended heavy oil feedstock is prepared within a system as illustrated in FIG. 4. A diluted catalyst precursor is first prepared by mixing a stream having a flowrate of about 75 kg/hr of catalyst precursor with a stream having a flowrate of about 6,000 kg/hr of decant oil diluent at about 100° C. The two streams are mixed together within a first in-line low shear static mixer. A stream of heavy oil feedstock having a flow rate of about 225,000 kg/hr is divided into two streams. The first stream has a flowrate of about 164,925 kg/hr, about 73% of the total heavy oil feedstock flowrate. The second stream has a flowrate of about 60,075 kg/hr. Both streams are at about 180° C. The first stream is mixed with the diluted catalyst precursor stream in a second slip stream in-line low shear mixer. The combined flow is then introduced into a high shear dynamic mixer comprising a vessel with a propeller for forcing the incoming fluid through a series of open slots (e.g., an 800LS Silverson high shear mixer having a volume of about 6.5 liters) for providing high shear, turbulent mixing to the contents of the vessel. The residence time of the high shear mixer is about 0.14 second. The combined flow stream leaving the high shear dynamic mixer is then introduced, along with the second stream of heavy oil feedstock, into a surge tank.

Within the surge tank, the catalyst precursor continues to diffuse throughout the heavy oil feedstock through molecular diffusion. The surge tank has a residence time of about 30 minutes. The heavy oil feedstock is pumped out of the surge tank through three multi-stage high pressure pumps arranged in parallel so as to provide sufficient flowrate capacity for delivery to a hydroprocessing system downstream for hydroprocessing the conditioned heavy oil feedstock. Each pump includes 10 compression stages. As the feedstock is pumped through the pumps, passing the heavy oil and catalyst precursor through the series of compression stages further distributes the catalyst precursor throughout the heavy oil.

Throughout the process, the temperature is maintained below that at which substantial decomposition of the catalyst precursor would otherwise occur. Once the catalyst precursor has been well mixed throughout the heavy oil, the feedstream is heated so as to cause decomposition of the precursor and formation of the catalyst. A colloidal and/or molecular catalyst is formed throughout the heavy oil feedstock. The initial concentration of the molybdenum catalyst metal in the colloidal and/or molecular catalyst is about 50 parts per million (ppm).

Example 2

A blended heavy oil feedstock is prepared within a system as illustrated in FIG. 3. A diluted catalyst precursor is first prepared by mixing a stream having a flowrate of about 75 kg/hr of catalyst precursor with a stream having a flowrate of about 6,000 kg/hr of decant oil diluent at about 100° C. The two streams are mixed together within a first in-line low shear static mixer. A stream of heavy oil feedstock having a flow rate of about 225,000 kg/hr at about 180° C. is provided for conditioning. The heavy oil feedstock stream is mixed with the diluted catalyst precursor stream in a second slip stream in-line low shear mixer. The combined flow is then introduced into a high shear dynamic mixer comprising a vessel with a propeller for forcing the incoming fluid through a series of open slots (e.g., an 800LS Silverson high shear mixer having a volume of about 6.5 liters) for providing high shear, turbulent mixing to the contents of the vessel. The residence time of the high shear mixer is about 0.1 second. The combined flow stream leaving the high shear dynamic mixer is then introduced into a surge tank.

Within the surge tank, the catalyst precursor continues to diffuse throughout the heavy oil feedstock through molecular diffusion. The surge tank has a residence time of about 30 minutes. The heavy oil feedstock is pumped out of the surge tank through three multi-stage high pressure pumps arranged in parallel so as to provide sufficient flowrate capacity for delivery to a hydroprocessing system downstream for hydroprocessing the conditioned heavy oil feedstock. Each pump includes 10 compression stages. As the feedstock is pumped through the pumps, passing the heavy oil and catalyst precursor through the series of compression stages further distributes the catalyst precursor throughout the heavy oil.

Throughout the process, the temperature is maintained below that at which substantial decomposition of the catalyst precursor would otherwise occur. Once the catalyst precursor has been well mixed throughout the heavy oil, the feedstream is heated so as to cause decomposition of the precursor and formation of the catalyst. A colloidal and/or molecular catalyst is formed throughout the heavy oil feedstock. The initial concentration of the molybdenum catalyst metal in the colloidal and/or molecular catalyst is about 50 parts per million (ppm).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for preparing a conditioned heavy oil feedstock, comprising:
   an oil-soluble catalyst precursor stream;
   a hydrocarbon diluent stream having a boiling point of at least about 150° C., that is substantially water free such that the hydrocarbon diluent contains less than 0.5% water, the hydrocarbon diluent being selected from vacuum gas oil, decant oil, cycle oil, start up diesel, or light gas oil;
   a heavy oil feedstock stream comprising asphaltenes and hydrocarbons with a boiling point of about 524° C. or higher;
   a continuous flow pre-mixer configured and operable for receiving and pre-mixing the oil-soluble catalyst precursor stream and the hydrocarbon diluent stream at a temperature in a range of about 25° C. to about 300° C. and without decomposition of the oil-soluble catalyst precursor and without formation of active catalyst particles to form a diluted catalyst precursor mixture stream;
   a second continuous flow mixer, downstream from the continuous flow pre-mixer and upstream from a heater for decomposing the catalyst precursor and forming active catalyst particles, configured and operable for receiving and initially mixing the diluted catalyst precursor mixture stream and the heavy oil feedstock stream for a time period in a range of about 0.005 second to about 20 seconds at a temperature in a range of about 25° C. to about 300° C. and without decomposition of the oil-soluble catalyst precursor and without formation of active catalyst particles to form a conditioned heavy oil feedstock stream; and
   at least one additional mixer, downstream from the second mixer and upstream from a heater for decomposing the catalyst precursor and forming active catalyst particles, configured and operable for receiving and further mixing of the conditioned feedstock stream to thoroughly mix the oil-soluble catalyst precursor with the heavy oil feedstock without decomposition of the oil-soluble catalyst precursor and without formation of active catalyst particles.

2. A system as in claim 1, wherein the hydrocarbon diluent comprises one or more of vacuum gas oil or light gas oil.

3. A system as recited in claim 1, wherein the pre-mixer is configured and operable to provide a weight ratio of oil-soluble catalyst precursor to hydrocarbon diluent in a range of about 1:150 to about 1:2.

4. A system as in claim 1, wherein the pre-mixer is configured and operable for pre-mixing at a temperature in a range of about 50° C. to about 200° C. and the pre-mixer is configured and operable for mixing at a temperature in a range of about 50° C. to about 200° C.

5. A system as in claim 1, wherein the pre-mixer comprises a static low shear in-line mixer.

6. A system as in claim 5, wherein the static low shear in-line mixer is characterized as including between about 2 and about 20 mixing stages.

7. A system as in claim 5, wherein the static low shear in-line mixer is characterized as including between about 7 and about 15 mixing stages.

8. A system as in claim 5, wherein the static low shear in-line mixer is characterized as including between about 8 and about 12 mixing stages.

9. A system as in claim 1, wherein the second mixer comprises a static low shear in-line mixer.

10. A system as in claim 9, wherein the static low shear in-line mixer is characterized as including between about 2 and about 20 mixing stages.

11. A system as in claim 9, wherein the static low shear in-line mixer is characterized as including between about 7 and about 15 mixing stages.

12. A system as in claim 9, wherein the static low shear in-line mixer is characterized as including between about 8 and about 12 mixing stages.

13. A system as in claim 9, wherein the at least one additional mixer comprises a dynamic continuous flow high shear mixer.

14. A system as recited in claim 13, wherein the dynamic high shear mixer is configured to provide a residence time between about 0.001 second and about 20 minutes.

15. A system as recited in claim 13, wherein the dynamic high shear mixer is configured to provide a residence time between about 0.005 second and about 20 seconds.

16. A system as recited in claim 13, wherein the dynamic high shear mixer is configured to provide a residence time between about 0.01 second and about 3 seconds.

17. A system as in claim 1, wherein the second mixer comprises:
a first continuous flow conditioning mixer configured and operable for mixing the diluted catalyst precursor stream with a first portion of the heavy oil feedstock stream to form a catalyst precursor-heavy oil feedstock mixture stream; and
a second continuous flow conditioning mixer configured and operable for mixing the catalyst precursor-heavy oil feedstock mixture stream with a remainder of the heavy oil feedstock stream so that the catalyst precursor is substantially homogeneously dispersed throughout the heavy oil feedstock.

18. A system as in claim 13, the at least one additional mixer further comprising a surge tank, downstream from the dynamic high shear mixer, having a residence time so as to allow the catalyst precursor to diffuse more completely throughout and become substantially homogeneously dispersed within the heavy oil feedstock prior to decomposition of the catalyst precursor and formation of the active catalyst.

19. A system as in claim 18, wherein the surge tank is configured to provide a residence time between about 5 minutes and about 60 minutes.

20. A system as in claim 18, wherein the surge tank is configured to provide a residence time between about 10 minutes and about 50 minutes.

21. A system as in claim 18, wherein the surge tank is configured to provide a residence time between about 20 minutes and about 40 minutes.

22. A system as in claim 18, wherein the at least one additional mixer further comprises one or more multi-stage high pressure pumps downstream from the surge tank.

23. A system as in claim 22, wherein at least one of the one or more multi-stage high pressure pumps comprises at least about 10 compression stages.

24. A system as in claim 22, wherein the one or more multi-stage high pressure pumps comprises two or more pumps arranged in parallel.

25. A system as in claim 22, wherein the one or more multi-stage high pressure pumps comprises two or more pumps arranged in series.

26. A system for homogeneously mixing a catalyst precursor into a heavy oil feedstock prior to forming an active catalyst in situ within the heavy oil feedstock, the system comprising:
an oil-soluble catalyst precursor stream;
a hydrocarbon diluent stream having a boiling point of at least about 150° C., that is substantially water free such that the hydrocarbon diluent contains less than 0.5% water, the hydrocarbon diluent being selected from vacuum gas oil, decant oil, cycle oil, start up diesel, or light gas oil;
a heavy oil feedstock stream comprising asphaltenes and hydrocarbons with a boiling point of about 524° C. or higher;
a continuous flow pre-mixer configured and operable for pre-mixing the oil-soluble catalyst precursor stream with the hydrocarbon diluent stream at a temperature and conditions that do not cause the oil-soluble catalyst precursor to decompose so as to form a diluted catalyst precursor mixture stream;
a second continuous flow mixer, downstream from the continuous flow pre-mixer, configured and operable for receiving and initially mixing the diluted catalyst precursor mixture stream and the heavy oil feedstock stream at a temperature above 25° C. and below a temperature at which substantial decomposition of the catalyst precursor occurs to form a conditioned heavy oil feedstock stream;
a third continuous flow mixer, downstream from the second continuous flow mixer, configured and operable for receiving and further mixing of the conditioned feedstock stream to thoroughly mix the oil-soluble catalyst precursor with the heavy oil feedstock, wherein the second and third continuous flow mixers are configured to have a combined mixing time in a range of about 0.001 second to about 20 seconds; and
a surge tank, downstream from the continuous flow third mixer, having a residence time to cause the catalyst precursor to diffuse more completely throughout and become homogeneously dispersed throughout the heavy oil feedstock prior to heating the conditioned heavy oil feedstock to completely decompose the catalyst precursor, liberate catalyst metal, and form an active catalyst in situ within the heavy oil feedstock.

27. A system as in claim 26,
the continuous flow pre-mixer comprising first static low shear in-line mixer,
the second continuous flow mixer comprising a second in-line static mixer,
the third continuous flow mixer comprising a high shear mixer.

28. A system as in claim 27, wherein the surge tank is configured to provide a residence time between about 5 minutes and about 60 minutes.

29. A system as in claim 28, further comprising one or more multi-stage high pressure pumps for pumping the contents of the surge tank to a hydroprocessing reactor system.

30. A system as in claim 29, further comprising a pre-heater configured and operable to liberate sulfur from the heavy oil feedstock and react with the catalyst metal liberated from the catalyst precursor to form at least a portion of the active catalyst.

31. A system as in claim 1, wherein the system is configured to form a colloidal or molecular active catalyst.

32. A system as in claim 31, wherein the system is configured to form the colloidal or molecular active catalyst with a particle size less than about 100 nm.

33. A system as in claim 1, wherein the system is configured to form at least a portion of the active catalyst in situ within the heavy oil feedstock before the heavy oil feedstock is introduced into a hydroprocessing reactor.

34. A system as in claim 1, wherein the system is configured to form at least a portion of the active catalyst in situ within a hydroprocessing reactor.

35. A mixing system, positioned upstream from a hydroprocessing reactor system comprised of a pre-heater and a hydroprocessing reactor, for mixing a catalyst precursor into a heavy oil feedstock prior to forming an active catalyst in situ within the heavy oil feedstock, the mixing system comprising:

an oil-soluble catalyst precursor stream;

a hydrocarbon diluent stream having a boiling point of at least about 150° C. and that is substantially water free such that the hydrocarbon diluent contains less than 0.5% water;

a heavy oil feedstock stream comprising asphaltenes and hydrocarbons with a boiling point of about 524° C. or higher;

a first static low shear in-line mixer that includes from 2 to 20 mixing stages and is configured and operable for receiving and pre-mixing the oil-soluble catalyst precursor stream with the hydrocarbon diluent stream, and without causing the oil-soluble catalyst precursor to decompose, in order to form a diluted catalyst precursor mixture stream in which the catalyst precursor is substantially homogeneously dispersed throughout the hydrocarbon diluent;

a second static low shear in-line mixer, downstream from the first static low shear in-line mixer, that includes from 7 to 15 mixing stages and is configured and operable for receiving and mixing the diluted catalyst precursor mixture stream with the heavy oil feedstock to form a conditioned heavy oil feedstock stream;

a dynamic high shear mixer, downstream from the second static low shear in-line mixer, that provides a residence time from 0.01 to 3 seconds and is configured and operable for further mixing of the conditioned feedstock stream to thoroughly mix the oil-soluble catalyst precursor with the heavy oil feedstock prior to heating the conditioned heavy oil feedstock stream to a temperature that causes substantial decomposition of the catalyst precursor, liberate catalyst metal, and form an active catalyst, wherein the second static low shear in-line mixer and the dynamic high shear mixer are configured to have a combined mixing time in a range of about 0.001 second to about 20 seconds;

a surge tank, downstream from the dynamic high shear mixer, having a residence time so as to allow the oil-soluble catalyst precursor to diffuse more completely throughout and become substantially homogeneously dispersed within the heavy oil feedstock prior to decomposition of the oil-soluble catalyst precursor and formation of the active catalyst; and one or more multi-stage high pressure pumps, downstream from the surge tank, having at least 10 compression stages and configured for pumping the contents of the surge tank to the hydroprocessing reactor system comprised of the pre-heater and the hydroprocessing reactor.

36. A system for mixing an oil-soluble catalyst precursor into a heavy oil feedstock to form a conditioned heavy oil feedstock and heating the conditioned heavy oil feedstock prior to introduction into a hydroprocessing reactor, comprising:

an oil-soluble catalyst precursor stream;

a hydrocarbon diluent stream having a boiling point of at least about 150° C. and that is substantially water free;

a heavy oil feedstock stream comprising asphaltenes and hydrocarbons with a boiling point of about 524° C. or higher;

a pre-mixer configured and operable for pre-mixing the oil-soluble catalyst precursor stream with the hydrocarbon diluent stream at a temperature and conditions that do not cause the catalyst precursor to decompose in order to form a diluted catalyst precursor mixture stream;

a plurality of mixers, downstream from the pre-mixer, configured and operable for receiving and mixing the diluted catalyst precursor mixture stream with the heavy oil feedstock stream that is received into the one or more mixers below a temperature at which a substantial portion of the catalyst precursor decomposes to form a conditioned heavy oil feedstock stream in which the oil-soluble catalyst precursor is thoroughly mixed with the heavy oil feedstock, the plurality of mixers including a static low shear in-line mixer, a dynamic high shear mixer, a surge tank downstream from the high shear mixer, and one or more multi-stage high pressure pumps downstream from the surge tank, wherein the static low shear in-line mixer and the dynamic high shear mixer are configured to have a combined mixing time in a range of about 0.001 second to about 20 seconds; and a pre-heater, downstream from the plurality of mixers and upstream from a hydroprocessing reactor, configured and operable for receiving and heating the conditioned heavy oil feedstock stream so as to decompose at least a portion of the oil-soluble catalyst precursor, liberate catalyst metal therefrom, liberate sulfur from the heavy oil feedstock, and form at least a portion of an active catalyst in situ within the heavy oil feedstock before being introduced into a hydroprocessing reactor.

* * * * *

UNITED STATES PATENT AND TRADEMARK OFFICE
CERTIFICATE OF CORRECTION

PATENT NO. : 10,822,553 B2
APPLICATION NO. : 12/547278
DATED : November 3, 2020
INVENTOR(S) : Roger K. Lott It is certified that error appears in the above-identified patent and that said Letters Patent is hereby corrected as shown below:

On the Title Page

Page 3
Item (56), References Cited, U.S. Patent Documents, change "2006/175229 8/2006 Montana et al." to —2006/175229 8/2006 Montanari, et al.—

Page 4
Item (56), References Cited, Other Publications, change "Loft et al., "(HC)3 Process—A Slurry Hydrocracking Technology Designed to Convert Bottoms of Heavy Oils", 7th Unitar International Conference of Heavy Crude and Tar Sands, Beijing, Oct. 27, 2007, pp. 1-9." to —Lott et al., "(HC)3 Process—A Slurry Hydrocracking Technology Designed to Convert Bottoms of Heavy Oils", 7th Unitar International Conference of Heavy Crude and Tar Sands, Beijing, Oct. 27, 2007, pp. 1-9.—

Item (56), References Cited, Other Publications, change "U.S. Appl. No. 13/66,220, filed Apr. 19, 2013, Lott et al." to —U.S. Appl. No. 13/066,220, filed Apr. 19, 2013, Lott et al.—

In the Drawings

Please replace Fig. 4 with Fig. 4 as shown on the attached page

In the Specification

Column 3
Line 39, change "sheer" to —shear—

Column 8
Line 28, remove "oz"

Column 16
Line 5, change "$1000^3$" to —$1000^2$—

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*

Column 16
Line 6, change "$1000^6$" to —$1000^3$—

In the Claims

Column 21
Line 35, change "liberate" to —liberates— and "form" to —forms—